United States Patent
Kosty et al.

(10) Patent No.: US 7,384,494 B2
(45) Date of Patent: Jun. 10, 2008

(54) METHOD OF MAKING SEALS FROM POLYMER LAMINATED METALLIC CONSTRUCTIONS

(75) Inventors: John W. Kosty, Fountain Valley, CA (US); Jon M. Lenhert, Brea, CA (US); Michael A. MacIsaac, Orange, CA (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 497 days.

(21) Appl. No.: 11/010,638

(22) Filed: Dec. 13, 2004

(65) Prior Publication Data

US 2005/0140097 A1    Jun. 30, 2005

Related U.S. Application Data

(63) Continuation-in-part of application No. 10/029,046, filed on Dec. 21, 2001, now Pat. No. 6,830,641.

(60) Provisional application No. 60/312,003, filed on Aug. 13, 2001.

(51) Int. Cl.
F61J 15/32 (2006.01)
B32B 15/06 (2006.01)

(52) U.S. Cl. .............. 156/211; 156/222; 156/253; 156/268; 277/309; 277/549; 277/922

(58) Field of Classification Search .......... 277/309, 277/922, 549, 562
See application file for complete search history.

(56) References Cited

U.S. PATENT DOCUMENTS

| 768,675 A | 5/1904 | Meuser et al. |
|---|---|---|
| 2,647,002 A | 7/1953 | Brummer |
| 2,729,482 A | 1/1956 | Kosatka |
| 2,734,757 A * | 2/1956 | Martin ................. 277/376 |
| 2,826,441 A | 3/1958 | Niessen |
| 2,850,792 A | 9/1958 | Cobb |
| 2,979,345 A * | 4/1961 | Potter ................. 277/555 |
| 3,123,367 A | 3/1964 | Brummer et al. |
| 3,180,650 A | 4/1965 | Liebig |
| 3,375,571 A | 4/1968 | Skinner, Sr. et al. |
| 3,649,033 A | 3/1972 | Kondo |
| 3,661,400 A | 5/1972 | Weinand |
| 3,783,070 A * | 1/1974 | Zotter ................. 156/211 |
| 3,866,924 A | 2/1975 | French |
| 4,078,287 A | 3/1978 | Kupchick |
| 4,338,148 A | 7/1982 | Adell |
| 4,508,356 A | 4/1985 | Janian |
| 4,632,947 A | 12/1986 | Wolki |

(Continued)

FOREIGN PATENT DOCUMENTS

EP    0 926 408 A2    6/1999

(Continued)

Primary Examiner—Richard Crispino
Assistant Examiner—Barbara J. Musser
(74) Attorney, Agent, or Firm—Larson Newman Abel Polansky & White, LLP; Chi Suk Kim

(57) ABSTRACT

The disclosure is directed to a method of forming a seal device. The method includes forming a laminate construction including a flexible material layer and a rigid material layer, patterning the rigid material layer after forming the laminate construction, and shape forming the laminate construction into the seal device.

18 Claims, 18 Drawing Sheets

U.S. PATENT DOCUMENTS

| | | | |
|---|---|---|---|
| 4,900,386 A * | 2/1990 | Richter-Jorgensen | 156/250 |
| 5,052,696 A | 10/1991 | Hatch | |
| 5,147,494 A | 9/1992 | Torii et al. | |
| 5,163,692 A | 11/1992 | Schofield et al. | |
| 5,198,053 A * | 3/1993 | Duncan | 156/64 |
| 5,209,502 A | 5/1993 | Savoia | |
| 5,303,934 A | 4/1994 | Elliott | |
| 5,573,846 A | 11/1996 | Harig et al. | |
| 5,971,617 A | 10/1999 | Woelki et al. | |
| 5,975,534 A | 11/1999 | Tajima et al. | |
| 6,209,879 B1 | 4/2001 | Mizunoya et al. | |
| 6,244,600 B1 | 6/2001 | Leturcq | |
| 6,253,819 B1 * | 7/2001 | Frendle et al. | 156/518 |
| 6,687,968 B2 * | 2/2004 | Willerscheid et al. | 29/421.1 |

FOREIGN PATENT DOCUMENTS

EP  1004801 A2  5/2000

* cited by examiner

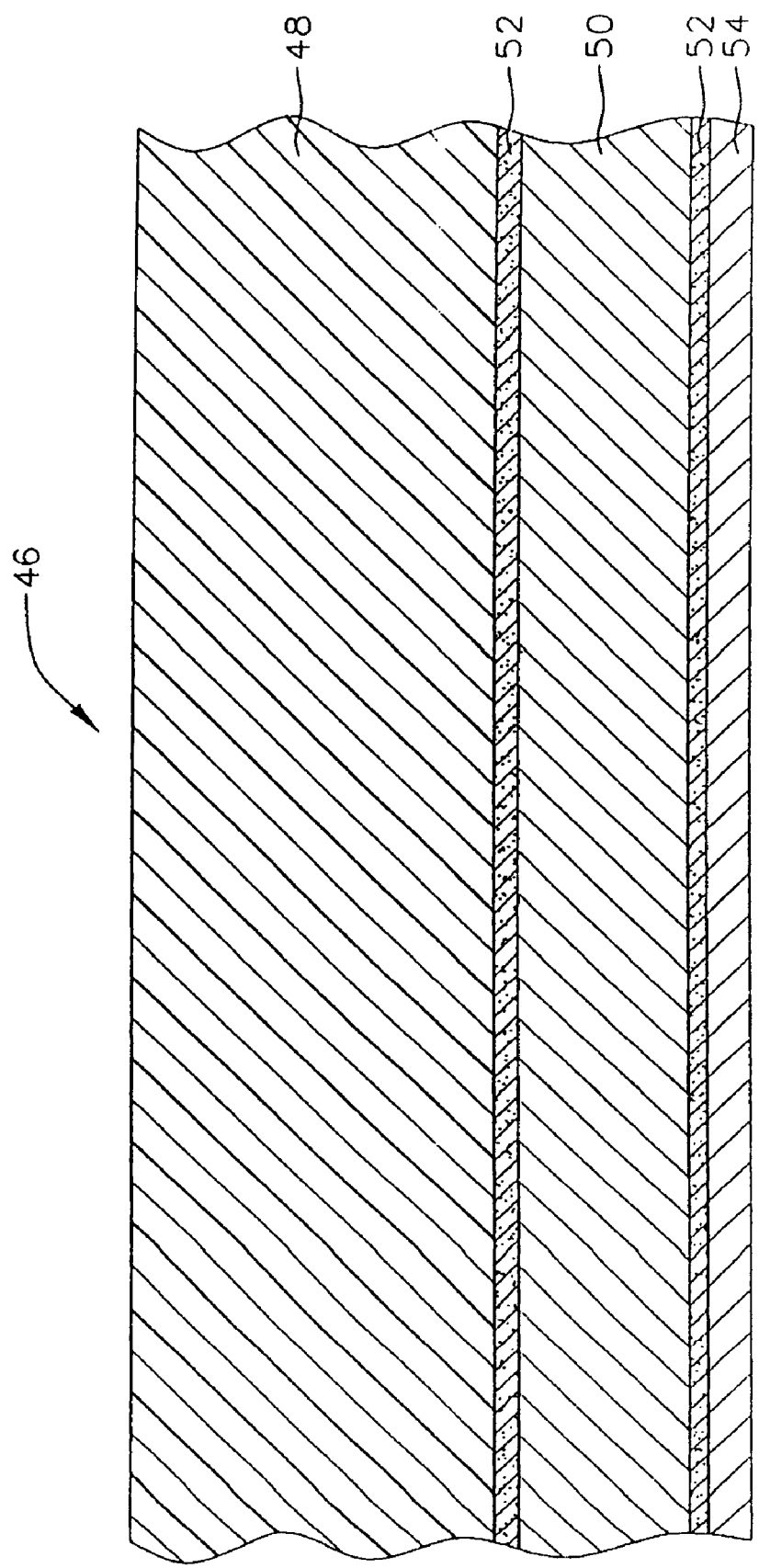

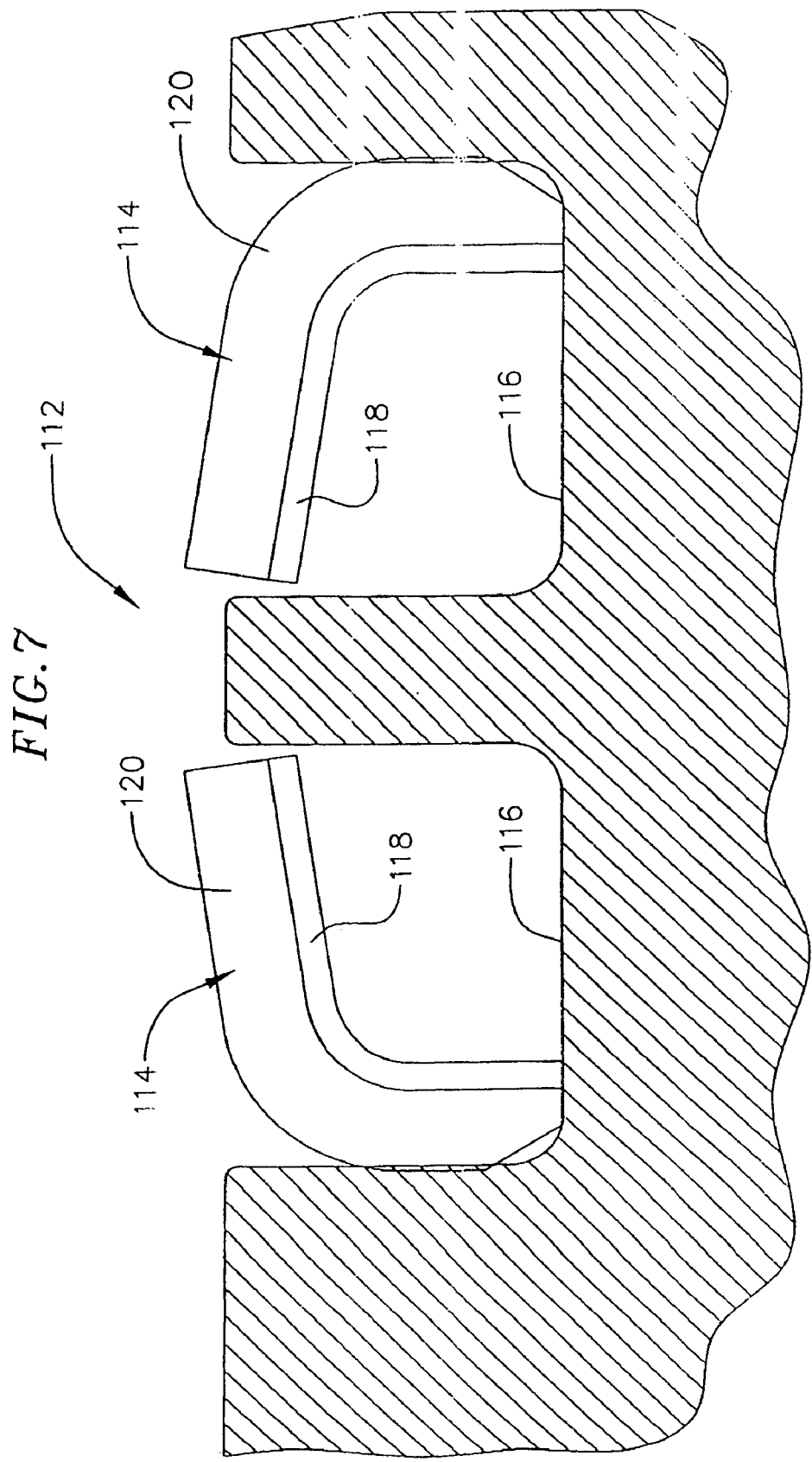

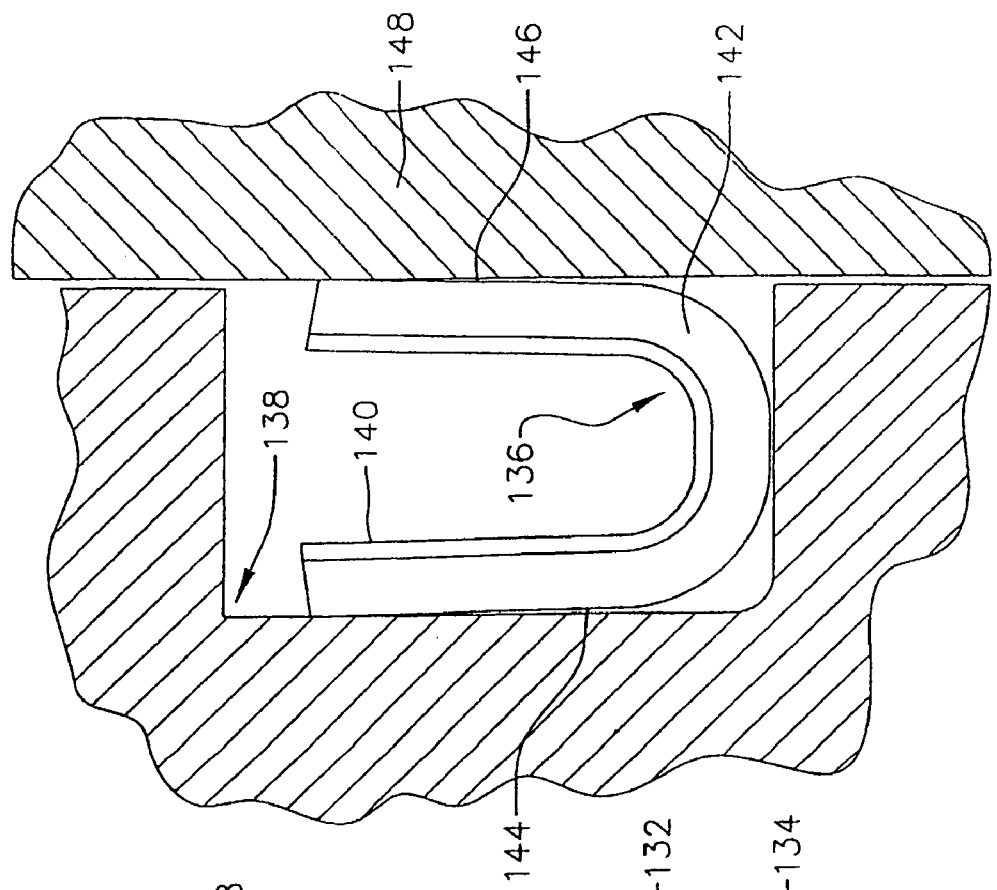
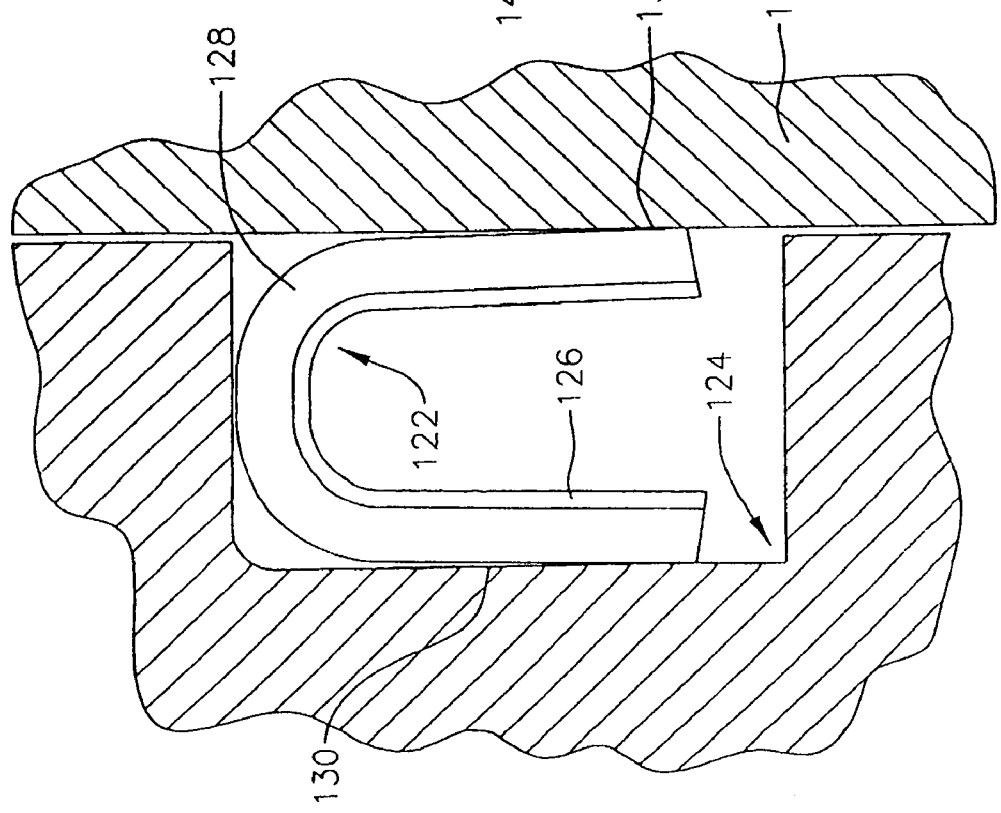

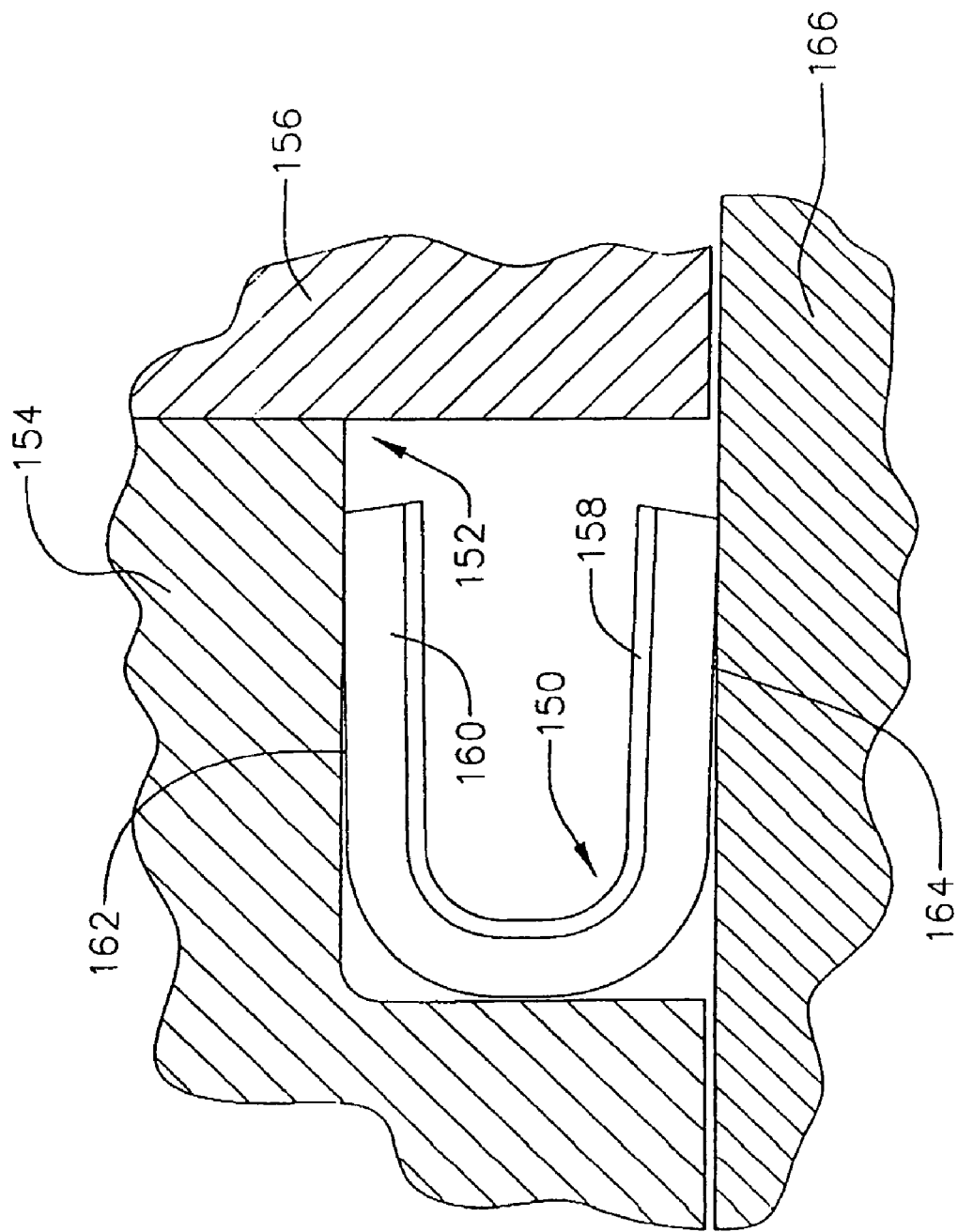

METHOD OF MAKING SEALS FROM POLYMER LAMINATED METALLIC CONSTRUCTIONS

CROSS-REFERENCE TO RELATED APPLICATION(S)

This application is a continuation-in-part application of U.S. application Ser. No. 10/029,046, filed Dec. 21, 2001 (U.S. Pat. No. 6,830,641), which claims benefit of the U.S. Provisional Application No. 60/312,003, filed Aug. 13, 2001, each of which is included in its entirety.

FIELD OF THE DISCLOSURE

This invention relates to sealing devices formed from laminated constructions and, more specifically, to sealing devices, e.g., seal rings and methods for forming the same, that are formed from polymer laminated metallic sheet constructions.

BACKGROUND

Sealing devices, such as seal rings or the like, are well known in the art for providing a seal between opposed sealing surfaces. Such sealing devices can be used to provide a leaktight seal between sealing surfaces that are static with respect to one another, and/or between sealing surfaces that are dynamic relative to one another, e.g., between a static and dynamic, or between two dynamic sealing surfaces. An example type of dynamic sealing application is a seal ring that is disposed between a static housing and a dynamic rotary or reciprocating sealing surfaces.

Such seal devices can be configured differently, depending on the specific sealing application. For example, seal rings can be configured in the form of a lip seal, comprising one or more lip elements that are designed to project away from the seal body to make contact with the dynamic sealing surface, or in the form of an energized seal, comprising one or more seal elements that are pressed into contact with a dynamic sealing surface by an energizing member disposed within the seal ring. Such seal rings can be used for oil or non-oil sealing applications, or for any type of gas or fluid sealing application.

Lip seals are well known in the art, and can be constructed to include a non-flexible metallic seal member and a relatively conformable nonmetallic, e.g., polymeric, seal member. The metallic seal member is typically in the form of a casing that is configured both to fit within a predetermined seal gland, and to provide a mounting substrate for the nonmetallic seal member. More specifically, the metallic seal member is in the form of a ring-shaped casing that is designed to provide a predetermined amount of compression or tension to the attached nonmetallic seal member forming the lip. In some cases, the ring-shaped casing can be formed from a number of different non-flexible metallic seal elements that are attached together in a predetermined arrangement to both retain and provide the desired tension or compression load onto the nonmetallic seal lip member.

Energized seals are well known in the art, and can be constructed to include a seal body formed from either a metallic or nonmetallic material, depending on the particular seal application, and an energizing member positioned within the seal body to urge a portion the seal body into contact with the dynamic sealing surface. In one application example, the energized seal comprises an annular-shaped seal body that is formed from a relatively flexible or conformable polymeric material, and an energizer formed from a metallic material that is disposed within a channel defining the U-shape of the seal body. Depending on the specific sealing application, such U-shaped seals can be used to provide a radial sealing surface, e.g., between a radially aligned dynamic sealing surface and an inside or outside diameter surface of the seal body, or to provide an axial seal surface, e.g., between an axially aligned dynamic sealing surface and an inside or outside diameter surface of the seal body.

Such known lip seals and energized seals are formed according to a multi-step process that involves both forming the different seal members, e.g., the metallic seal member and/or the polymeric seal member, and attaching the different seal members together. For example, lip seals know in the art are constructed by first forming the metallic casing, be it a single metallic element or multiple metallic elements, by machining and/or molding process, and then separately forming the polymeric lip member by machining and/or molding process. Once the separate metallic and polymeric seal members are formed, they are attached together by conventional chemical and/or mechanical attachment techniques. This construction process of having to separately form the seal members and attach the same is both time consuming and labor intensive, affecting both the production rate and cost of making the same.

There is, therefore, a need for a seal device having a simplified construction that enables/facilitates fabrication in a manner that avoids one or more manufacturing steps, thereby both increasing the production rate and reducing the labor and/or material costs associated with making the same. It is also desired that such seal devices be capable of providing such manufacturing efficiencies without compromising sealing performance when compared to conventional seals. It is still further desired that such seal devices be capable of retrofit use within existing seal housings, thereby replacing conventional seal devices without any or only minimal seal housing modification.

SUMMARY

In one particular embodiment, the disclosure is directed to a method of forming a seal device. The method includes forming a laminate construction including a flexible material layer and a rigid material layer, patterning the rigid material layer after forming the laminate construction, and shape forming the laminate construction into the seal device.

In another exemplary embodiment, the disclosure is directed to a method of forming a seal device. The method includes laminating a polymeric material layer to a metallic sheet to form a laminated construction, patterning the metallic sheet and not substantially patterning the polymeric material layer after laminating the polymeric material layer to the metallic sheet, and shape forming the laminated construction into the seal device.

In a further exemplary embodiment, the disclosure is directed to a flat laminated construction useful in forming an annular seal device. The flat laminated construction includes a polymeric material layer and a rigid material layer laminated to the polymeric material layer. The rigid material layer is configured to have a contour that radially varies relative to a center point.

In another exemplary embodiment, the disclosure is directed to a method of forming a seal device. The method includes patterning a rigid material layer, forming a laminate construction including a flexible material layer and the rigid material layer, and shape forming the laminate construction into the seal device.

In a further exemplary embodiment, the disclosure is directed to a method of forming a seal device. The method includes laminating a flexible sheet material to a rigid sheet material using a hot process melt adhesive to form a laminate construction and shape forming the laminate construction to form a seal device.

BRIEF DESCRIPTION OF THE DRAWINGS

The present disclosure may be better understood, and its numerous features and advantages made apparent to those skilled in the art by referencing the accompanying drawings.

FIG. 3A is a schematic cross-sectional side elevational view illustrating a polymer laminated construction sheet stock that is used to form seal rings constructed according to principles of this invention;

FIG. 7 is a cross-sectional side elevational view illustrating an installed L-shaped seal as constructed according to principles of this invention from a polymer laminated construction;

FIGS. 8A and 8B are cross-sectional side elevational views illustrating U-cup seals, as constructed according to principles of this invention from a polymer laminated construction, as installed in axial seal glands for axial sealing service;

FIG. 9A is a cross-sectional side elevational view illustrating a U-cup seal, as constructed according to principles of this invention from a polymer laminated construction, as installed in a radial seal gland for radial sealing service;

The use of the same reference symbols in different drawings indicates similar or identical items.

DESCRIPTION OF THE PREFERRED EMBODIMENT(S)

Seal devices of this invention can be in the form of seal rings or linear seals having both a relatively rigid, e.g., metallic, member and a compliant, i.e., nonmetallic, member, and are fabricated from a substrate having a polymeric material laminated thereto prior to forming. Using such polymer laminated substrate construction enables formation of seals having both a relatively rigid member and a relatively flexible nonmetallic member by a single step of shape forming, without having to perform separate steps of both producing the relatively rigid and flexible seal members, and without having to perform the subsequent step of attaching the two materials together, thereby reducing manufacturing time and associated labor costs.

Seal devices, constructed according to principles of this invention, can be configured having a variety of different shapes, e.g., ring-shaped seals, linear seals, or the like. For example, seal devices of this invention configured in the form of seal rings can be configured in the form of lip seals, energized seals, and other well known types of seals comprising both a relatively inflexible metallic member (used to provide a static engagement surface with a seal gland), and a relatively flexible polymeric member (used to provide an engagement surface with a dynamic sealing surface). Accordingly, while specific seal embodiments of this invention are described and illustrated, it is to be understood that seals and methods for making the same according to this invention, can be configured differently than expressly described and/or illustrated herein.

Figure 1:
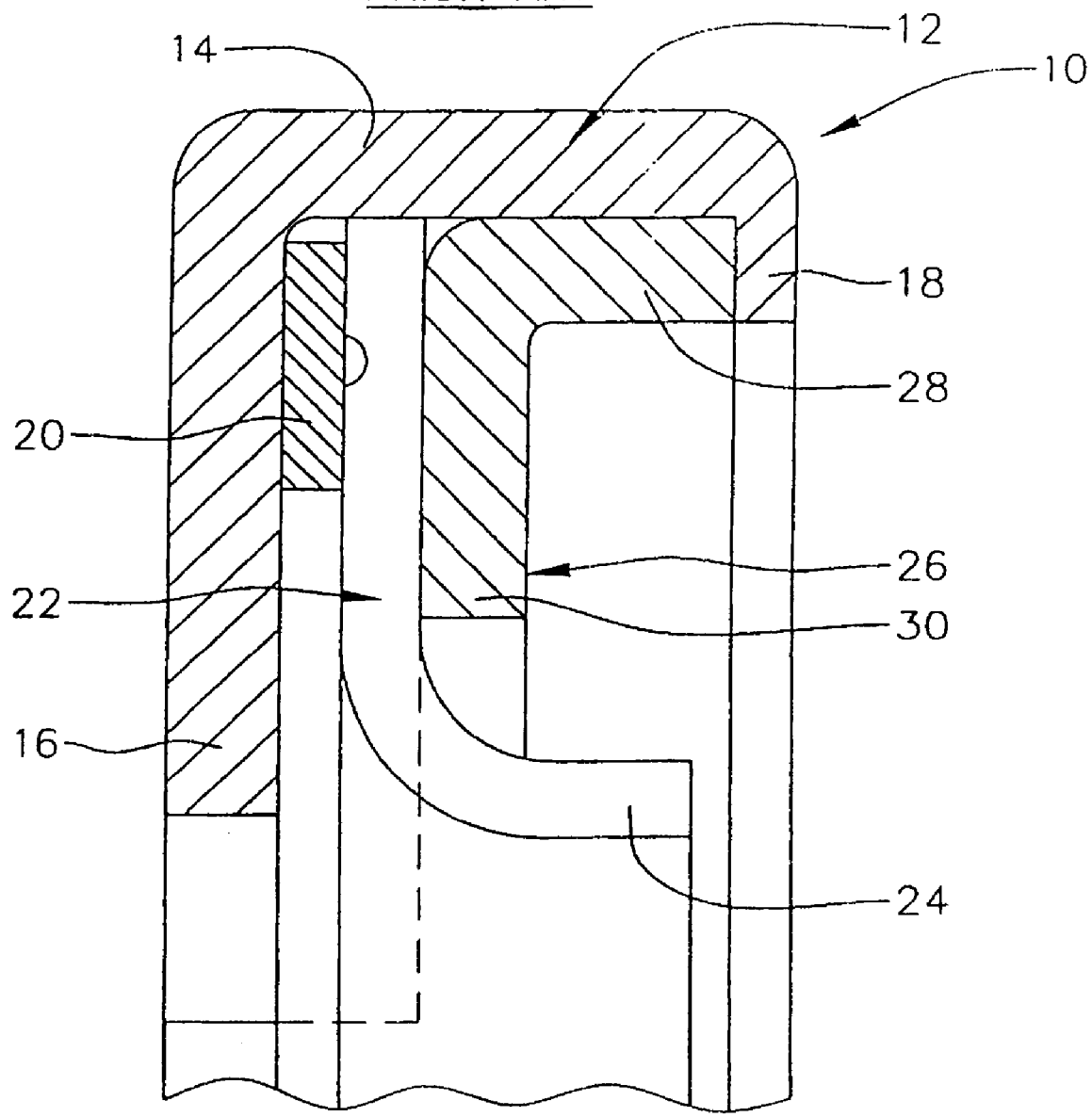
FIG. 1 is a cross-sectional side elevational view illustrating a prior art multi-piece seal assembly forming a conventional lip seal.

FIG. 1 illustrates a conventional prior art lip seal 10 comprising four independent seal elements that are each independently formed, by machine and/or molding process, and that are subsequently assembled together. Specifically, the lip seal 10 comprises an annular outer case 12 that can be formed from a structurally rigid material such as metal, and that has an outside surface that is configured for placement against a static sealing surface within a seal gland. In this example, the outer case 12 includes an axially extending surface 14, a radially extending surface 16, and an inwardly projecting lip 18 that defines the terminal edge of the axially extending surface 14. Generally speaking, the remaining three lip seal elements are positioned within the outer case between the radially extending surface 16 and the projecting lip 18.

Moving from left to right in FIG. 1 away from the radially extending surface 16, the lip seal includes an annular gasket 20 that can be formed from a metallic, polymeric, and/or an elastomeric material, e.g., a nitrile elastomer. The gasket 20 is interposed between the outer case 12, along one of its axial surfaces, and a sealing element 22, along the other of its axial surfaces. The sealing element 22 has an annular configuration and extends radially inwardly away from the outer case axially extending surface 14. In this example lip seal embodiment, the sealing element 22 is configured having a 90 degree bend outwardly away from the outer case radially extending surface 16 that forms a lip portion 24 of the seal. The sealing element is preferably formed from a compliant material, e.g., a polymeric material, that will provide a leak-tight seal against a dynamic shaft surface.

Finally, an inner case 26 is positioned within the outer case and is interposed between the sealing element 22 and the outer case projecting lip 18. The inner case includes an axially extending surface 28, that is positioned against a portion of the outer case axially extending surface 14, and a radially inwardly extending surface 30 that is positioned against an axial surface of the sealing element 22. Together, the inner case, outer case, and gasket are configured to retain the sealing element 22 within the lip seal. Additionally, the inner and outer cases are configured to impose and maintain a desired compression load onto the sealing element 22, for sealing engagement with a dynamic shaft surface, when the lip seal is installed for service within a seal gland.

As mentioned briefly above, such prior art lip seal comprises a number of individual elements that must be manufactured individually and subsequently assembled together. Further, in order for the lip seal to successfully perform its function, all of the separate elements must both be configured within a defined manufacturing tolerance, and assembled or combined together properly. Improper sizing or configuration of the elements, and/or improper assembly of the elements, can result in a lip seal that is either not capable of providing a leak-tight seal, or that may be capable of providing a seal for a reduced service life.

Figure 2:
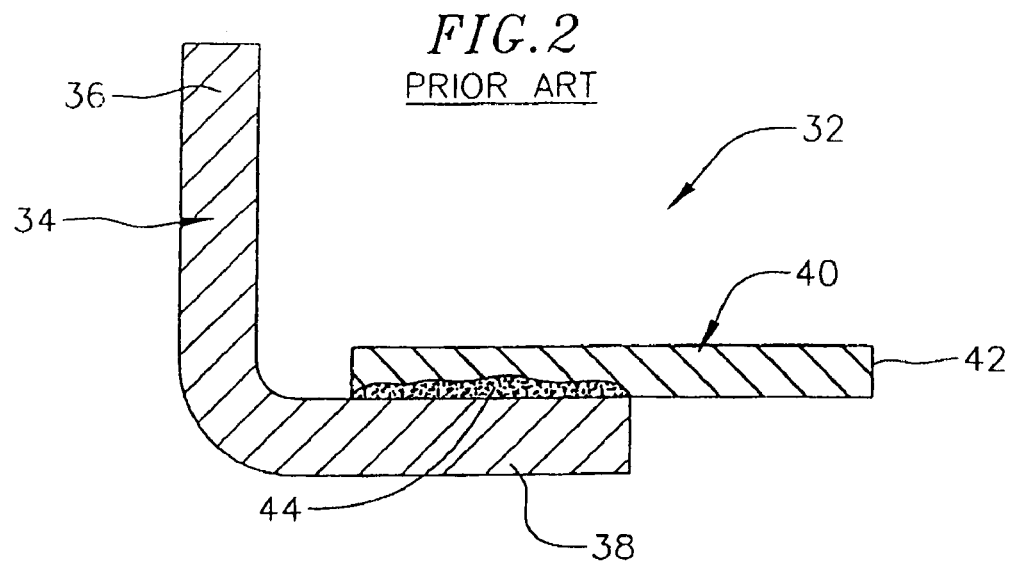
FIG. 2 is a cross-sectional side elevational view illustrating another prior art seal assembly forming a conventional lip seal.

FIG. 2 illustrates another type of prior art lip seal 32 that is different from that described above and illustrated in FIG. 1 in that it is made of only two elements. This example sealing element is disclosed in U.S. Pat. No. 5,198,053, which is incorporated herein by reference. In this example, the lip seal comprises an annular case 34 formed from a structurally rigid material, e.g., metal, having an axially extending surface 36 and a radially extending surface 38. Like the lip seal described above, the case 34 has an outside surface that is configured for placement against a static surface of a seal gland.

A sealing element 40 is formed from a compliant material, e.g., a polymeric and/or elastomeric material, and is positioned along the case radially extending surface 38. The sealing element 40 includes a lip 42 that extends axially a distance beyond the case and that is configured to provide sealing contact against a dynamic shaft surface. A suitable adhesive 44 is interposed between the sealing element 40 and the case, and is used to attach the sealing element to the case.

This example prior art lip seal 32 is manufactured by the process of first forming the metallic case, to provide a case configuration that is capable of being mounted within a known seal gland, and to provide a desired loading force onto the sealing element for contact against a dynamic shaft surface when the lip seal is installed within the seal gland. The sealing element is produced separately from the metallic case by conventional molding process. After forming the case and fabricating the sealing element, the sealing element is attached by adhesive means to the preformed case. While this prior art lip seal does not have the same large number of elements necessary to complete the assembly, as the lip seal in FIG. 1, the manufacturing process for making this lip seal still involves a multi-step process of individually making the case and sealing element, by machining and/or molding processes, and subsequently assembling the individual seal members together.

For purposes of both reducing the number of manufacturing and assembly steps associated with fabricating seal rings, seal rings of this invention are formed from a polymer laminated metallic construction. FIG. 3A illustrates an example laminated construction 46 suitable for use in making seal rings according to principles of this invention comprising a polymer layer 48 of desired thickness that is disposed onto a relatively rigid substrate 50. The polymer layer 48 can be formed from a number of different available polymers, depending on the particular seal application, as the completed seal ring embodiment the polymer layer serves as the sealing element.

Example types of polymer materials useful for forming the laminated construction include any type of organic polymer that can be bonded to the relatively rigid substrate surface. Example organic polymers include, but are not limited to polypropylene; polyethylene; nitrile elastomers; fluoropolymers such as polytetrafluoroethylene (PTFE), fluorinated ethylene-propylene (FEP), perfluoroalkoxy fluorocarbon resin (PFA), polychlorotrifluoroethylene (PCTFE), ethylenechlorotrifluoroethylene copolymer (ECTFE), ethylenetetrafluoroethylene copolymer (ETFE), polyvinylidene fluoride (PVDF), polyvinyl fluoride (PVF); acetal; polycarbonate; polyimides; polyetherimide; polyether ether ketone (PEEK); polysulfones (e.g., polyethersulfone); polyamide (Nylon); polyphenylene sulfide; polyurethane; polyester; polyphenylene oxide; and blends (e.g., copolymers) and alloys thereof. Other materials useful for forming the polymer layer are disclosed in U.S. Pat. Nos. 5,573,846; 4,632,947; and 5,971,617, which are each incorporated herein by reference. In an example embodiment, the polymer layer 48 is formed from PTFE.

In addition to the polymer material, the polymer layer may comprise one or more fillers and/or pigments, to provide certain desired seal performance properties, such as mechanical strength, lubricity, thermal and/or electrical conductivity, wear resistance, or appearance, i.e., color. For example, the polymer material can include certain lubricating agents such as graphite where it is desired that the sealing agent have a low friction/wear resistant surface. Example fillers include, but are not limited to, graphite, carbon, aluminum oxide, ceramic materials, glass, bronze, molybdenum disulfide, silicon carbide, aromatic polyester, fluoropolymer, and mixtures thereof. The proportion of fillers and/or pigments used to form the polymer material layer is understood to vary depending on the type of polymer material selected, and the particular type of seal application.

The polymer material layer 48 is bonded to the substrate 50 by use of a suitable bonding agent 52 that is interposed therebetween. The bonding agent is readily compatible with both the substrate and polymer layer surfaces to facilitate adhesion therebetween. Suitable bonding agents include fluoropolymers such as PFA, MFA, ETFE, FEP, PCTFE, PVDF, curing adhesives such as epoxy, polyimide adhesives, and lower temperature hot melts such as EVA and polyether/polyamide copolymer (Pebox). Examples of suitable bonding agents are disclosed in both U.S. Pat. Nos. 5,573,846; and 5,971,617. In an example embodiment, where the polymer material is PTFE, a suitable bonding agent can be any one of a number of high-temperature thermoplastic film materials, such as PFA and ETFE.

The substrate 50 can be formed from one of a number of different materials depending of the particular properties called for by the seal application. Example substrate materials include metallic substances and metals such as steel, aluminum, titanium, stainless steel, conventional drawing-quality sheet steel, brass or other alloys. The substrate can also be formed from nonmetallic materials such as plastics, ceramics, or composites utilizing glass and/or carbon fibers. The substrate surface may be left untreated or may be treated using various techniques such as galvanizing, chromate or phosphate treatments, anodizing, mechanical sandblasting or etching, and/or chemical pickling. Examples of suitable substrate materials are disclosed in both U.S. Pat. Nos. 5,573,846; and 5,971,617. The substrate may be flat, e.g., in the configuration of a sheet, or can be nonplanar, e.g., having a curved or tubular configuration.

In an example embodiment, the polymer laminated construction is in the form of a PTFE laminated metal sheet that is commercially available under the product name Norglide from the Saint Gobain Corporation. If desired, the polymer laminated construction can include a further (optional) cover layer 54 disposed over the exposed surface of the substrate 50, e.g., for the purpose of protecting the substrate surface from damage during subsequent handling. The cover layer 54 is adhered to the substrate by use of a bonding agent 52 selected from the types of bonding agent materials disclosed above.

Figure 3B:
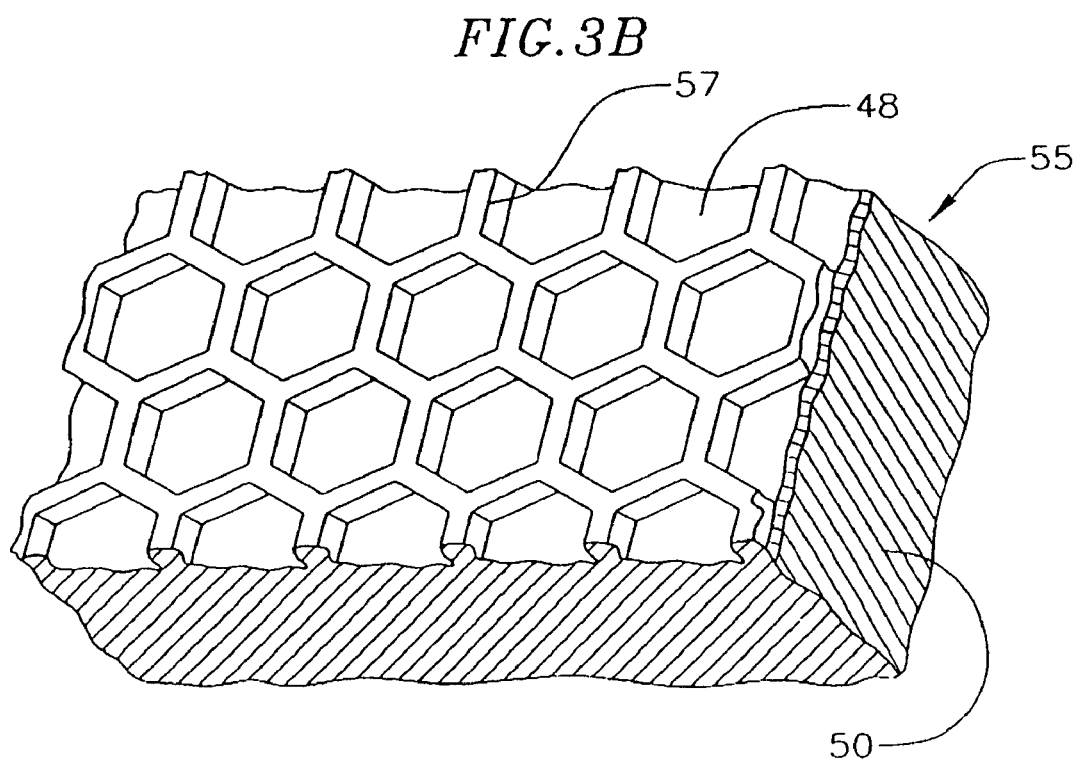
FIG. 3B is a perspective view illustrating a polymer laminated construction sheet stock that can be used to form seal rings constructed according to principles of this invention.

Additionally, the polymer laminated construction can be configured with the polymer laminated material having a particular surface treatment as disclosed in U.S. Pat. No. 5,971,617. FIG. 3B illustrates an example embodiment of such a laminated construction 55 whereby the polymer material layer 48 is constructed having a defined surface configuration of raised structures 57 extending upwardly therefrom. In this specific embodiment, the raised structures are hexagonal in shape. It is, however, to be understood that the specific configuration of the polymer material layer surface can and will vary depending on the particular seal device construction and on the particular seal application.

The laminated construction is made by applying the bonding agent and polymer layer onto the substrate by appropriate spray, dip, or other coating method. Methods of making the laminated construction are disclosed in both U.S. Pat. Nos. 5,573,846; and 5,971,617. The laminated construction has a polymer layer thickness that can vary depending on the particular seal application and polymer material selection.

In an example embodiment, for standard seal applications, the polymer layer thickness can be in the range of from 0.1 mm to 2 mm. Additionally, the substrate can have a layer thickness that will vary depending on the particular material selected and the seal application. For example, since the substrate layer can both serve as an outer casing for the seal, to accommodate attachment of the seal within a seal gland, and as a means for imposing a desired compression or loading force onto the sealing element, both of these functions must be taken into consideration when determining the substrate thickness. In an example embodiment, where the substrate is in the form of a metal sheet, the substrate thickness can be in the range of from 0.05 mm to 2 mm.

Figure 4:
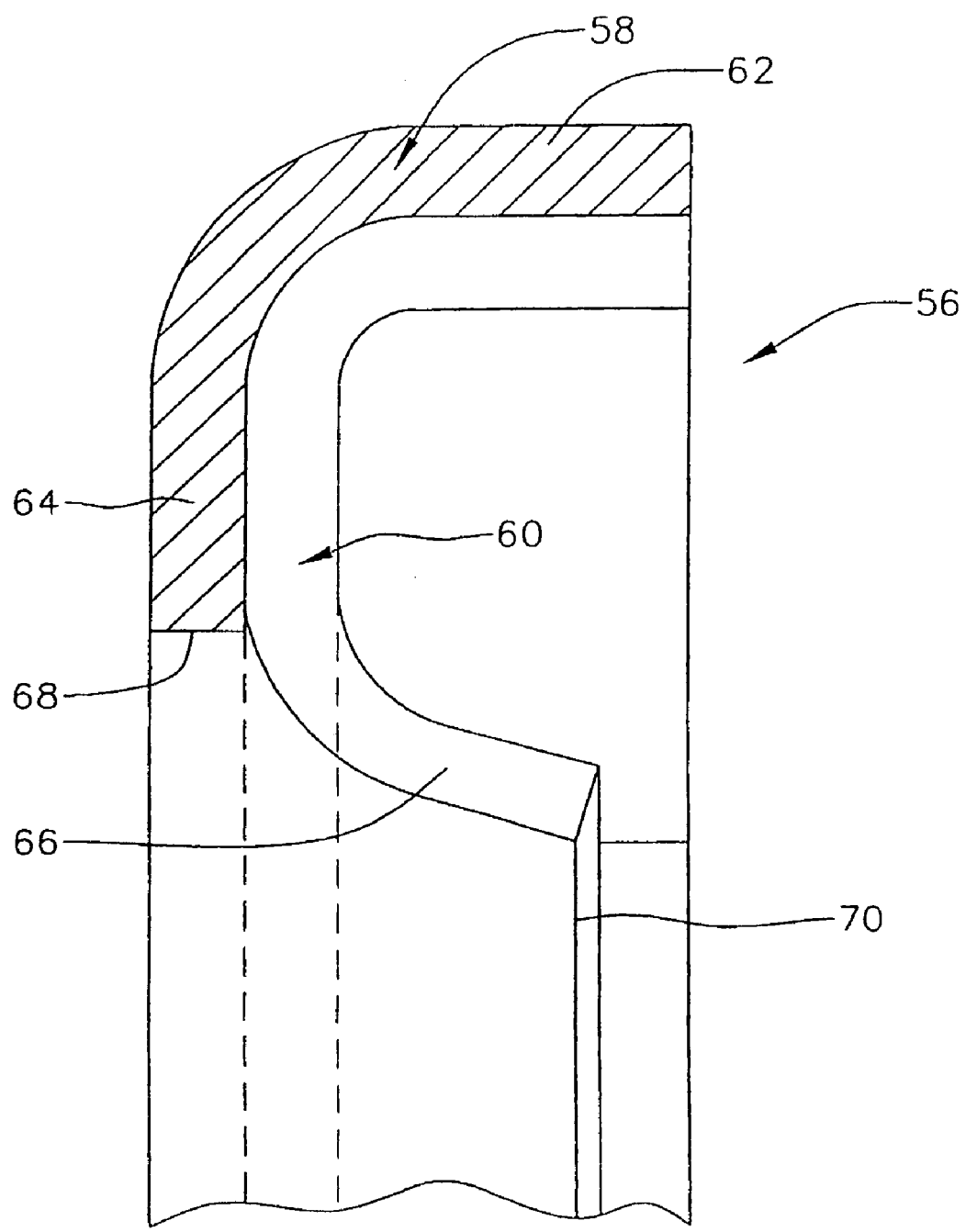
FIG. 4 is a cross-sectional side elevational view illustrating a seal ring in the form of a lip seal constructed according to principles of this invention from a polymer laminated construction.

FIG. 4 illustrates a seal ring, constructed according to principles of this invention, in the form of a lip seal 56. The lip seal 56 comprises a seal body constructed from the polymer laminated construction, described above and illustrated in FIG. 3. The lip seal body comprises a metallic substrate 58 and a low friction layer of sealing polymer compound 60 adherently bonded to at least a portion of the substrate. The sealing polymer compound 60 is in resilient contact with a sealing surface to provide a leak-tight seal thereagainst. The sealing surface may be static or dynamic relative to the sealing polymer compound 60.

The metallic substrate 58 is in the form of a rigid casing that is configured to both facilitate attachment with a seal gland, and impose a desired compression or load force onto the sealing polymer compound 60 when installed against a sealing surface such as a dynamic shaft surface. In this particular embodiment, the casing 58 comprises an axially extending surface 62 that transitions via a radiused portion by approximately 90 degrees into a radially extending surface 64. It is to be understood that this is but one example lip seal configuration, and that other lip seal configurations are intended to be within the scope of this invention.

The sealing polymer compound 60 is in the form of a sealing element that is configured to provide a leak-tight seal when placed into engagement with a dynamic shaft surface. The sealing element is adherently attached to the casing along the axial and radial extending surfaces 62 and 64, and includes an inwardly projecting portion 66 that extends beyond the casing inside diameter 68, and that terminates at a sealing lip 70.

A key feature of this lip seal 56 is that it is made from the laminate construction that is already in the form of a two-piece construction prior seal forming. Thus, use of such laminate construction enables formation of the lip seal without both having to form separate seal member, and without having to subsequently assemble separate seal members together. The lip seal of this invention is fabricated by simply taking the laminate construction, comprising the preassembled polymer layer and substrate, shape forming and cutting the preassembled laminate construction into the desired seal configuration. The ability to fabricate seals from such laminate construction in this manner provides increased manufacturing efficiency in the form of both increased seal production rates and reduced labor costs when compared to seals made from conventional materials according to conventional methods.

Lip seals formed from such laminate constructions can be fabricated by processing procedures that may, or may not, incorporate die punching, die forming, compression embossing, solid or fluid state hydroforming, chemical etching, coherent light laser cutting, or fluid jet cutting. These procedures may or may not be used to form the final product from bonded flat material stock and/or preform blanks.

Although the lip seal illustrated in FIG. 4 has been described in the form of a seal ring, linear seals may also be constructed having the same general cross-section configuration. As used herein, the term linear seal is intended to refer to a sealing device that is used between two adjacent sealing members that are not concentric with one another. An example linear seal application is for an aerospace door where the seal is used to provide a leak-tight seal between the door and the aircraft fuselage.

Figure 5A:
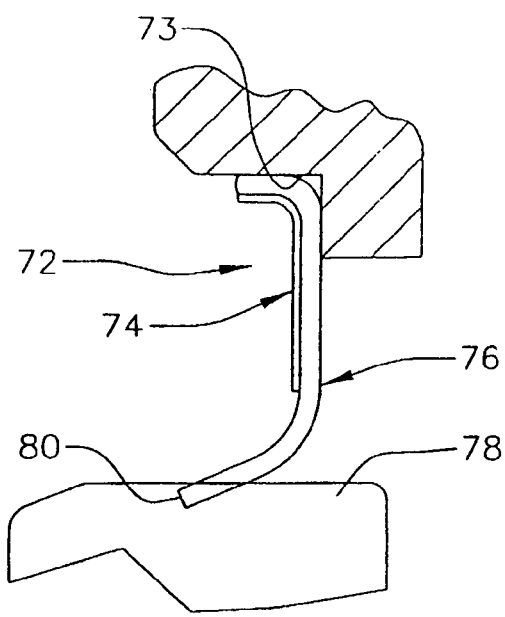
FIGS. 5A to 5C are cross-sectional side elevational views illustrating different embodiments of installed lip seals as constructed according to principles of this invention from a polymer laminated construction.
Figure 5B:
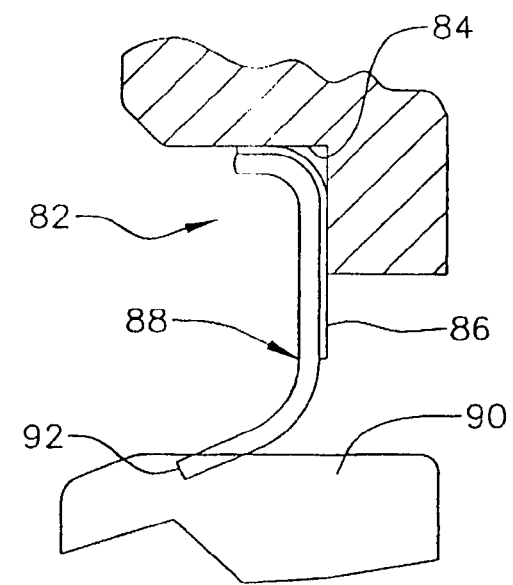
Figure 5C:
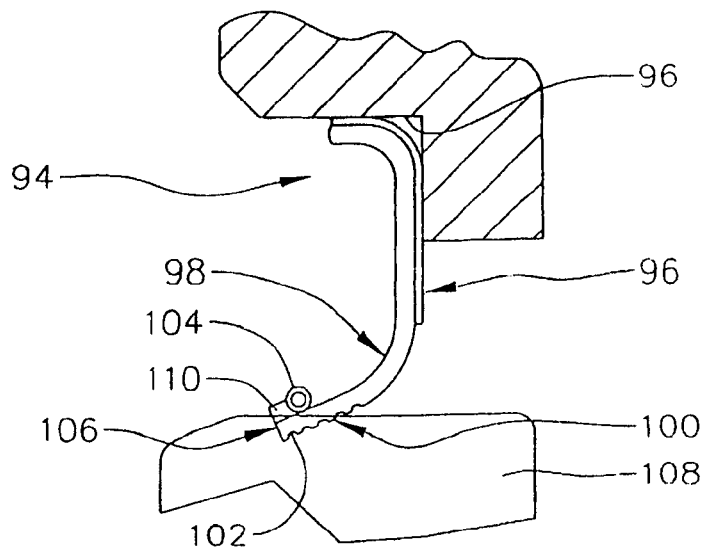

FIGS. 5A to 5C illustrate different embodiments of lip seals constructed according to principles of this invention using polymer laminated constructions. FIG. 5A illustrates a lip seal 72 that is installed within a seal gland or groove 73, and that comprises a seal body having a metallic substrate in the form of an inwardly disposed rigid casing member 74, and an outwardly positioned low-friction layer of sealing polymer compound in the form of a sealing element 76 that is interposed between the casing member and the seal gland 73 to provide a soft-bore sealing interface. In this lip seal embodiment, the casing member 74 is designed to provide an inside reinforcement to the sealing element 76 to urge the sealing element against both a surface of the sealing gland 73 and a dynamic sealing surface 78. Like the lip seal embodiment discussed above and illustrated in FIG. 4, the sealing element of this lip seal 72 includes a sealing lip 80 that projects outwardly away from the rigid casing member 74 to provide a compliant leak-tight seal against the dynamic sealing surface 78.

FIG. 5B illustrates a lip seal 82 that is installed within a seal gland or groove 84, and that comprises a seal body having a seal body having a metallic substrate in the form of an outwardly disposed rigid casing member 86, and an inwardly positioned low-friction layer of sealing polymer compound in the form of a sealing element 88. In this particular lip seal embodiment, the casing member 86 is interposed between the seal gland 84 and the sealing surface 88 to provide a metallic-bore sealing interface. In this lip seal embodiment, the casing member 86 is designed to provide an outside reinforcement to the sealing element 88 to urge the sealing element against a dynamic sealing surface 90. Like the lip seal embodiments discussed above, the sealing element of this lip seal 82 includes a sealing lip 92 that projects outwardly away from the rigid casing member 86 to provide a compliant leak-tight seal against the dynamic sealing surface 90.

FIG. 5C illustrates a lip seal 94 that is installed within a seal gland or groove 96 and, like the lip seal of FIG. 5B, comprises a seal body having a metallic substrate in the form of an outwardly disposed rigid casing member 96, and an inwardly positioned low-friction layer of sealing polymer compound in the form of a sealing element 98. The lip seal of this invention embodiment is similar to that disclosed above and illustrated in FIG. 5B, except for the design of the sealing element 98. Specifically, the sealing element is configured having a section projecting outwardly away from the casing member 96 that includes certain desired surface features provided for purposes of improving sealability against the dynamic sealing surface 108.

For example, the lip seal sealing element 98 can include an outside surface 100 that is embossed or otherwise treated to include one or more ridges or grooves 102 that are oriented radially at repeated spatial intervals along the sealing element surface. In such example embodiment, the outside surface 100 is configured having a plurality of threads 102 disposed therealong that are designed to direct any leaking fluid from the seal upstream back along the shaft surface, acting as a hydrodynamic lip thread. The desired surface features can be provided by cold formed hydrodynamic embossing or other types of surface treatment methods known in the art.

Each of the lip seals described above and illustrated in FIGS. 5A to 5C are constructed in the same manner as that described above for the lip seal illustrated in FIG. 4, i.e., from the polymer laminated metallic sheet stock material.

Additionally, the lip seal can be configured having a sealing element 98 with a loading means 106 positioned adjacent the sealing lip 106 for purposes of further urging the sealing lip 106 into sealing contact with the dynamic sealing surface 108. In an example embodiment, the lip seal is configured having a sealing lip 102 with a ridge 110 that projects outwardly in a direction perpendicular to the lip, and that is configured to retain a loading means thereagainst. In such example embodiment, the loading means 104 is in the form of a loading spring, e.g., a metallic garter loading spring, that extends radially around an inside surface of the sealing element, and that is retained therein by engagement with the ridge 110. As mentioned above, loading spring helps to urge the sealing lip portion of the sealing element against the dynamic sealing surface for ensuring a leak-tight seal therewith.

Figure 6:
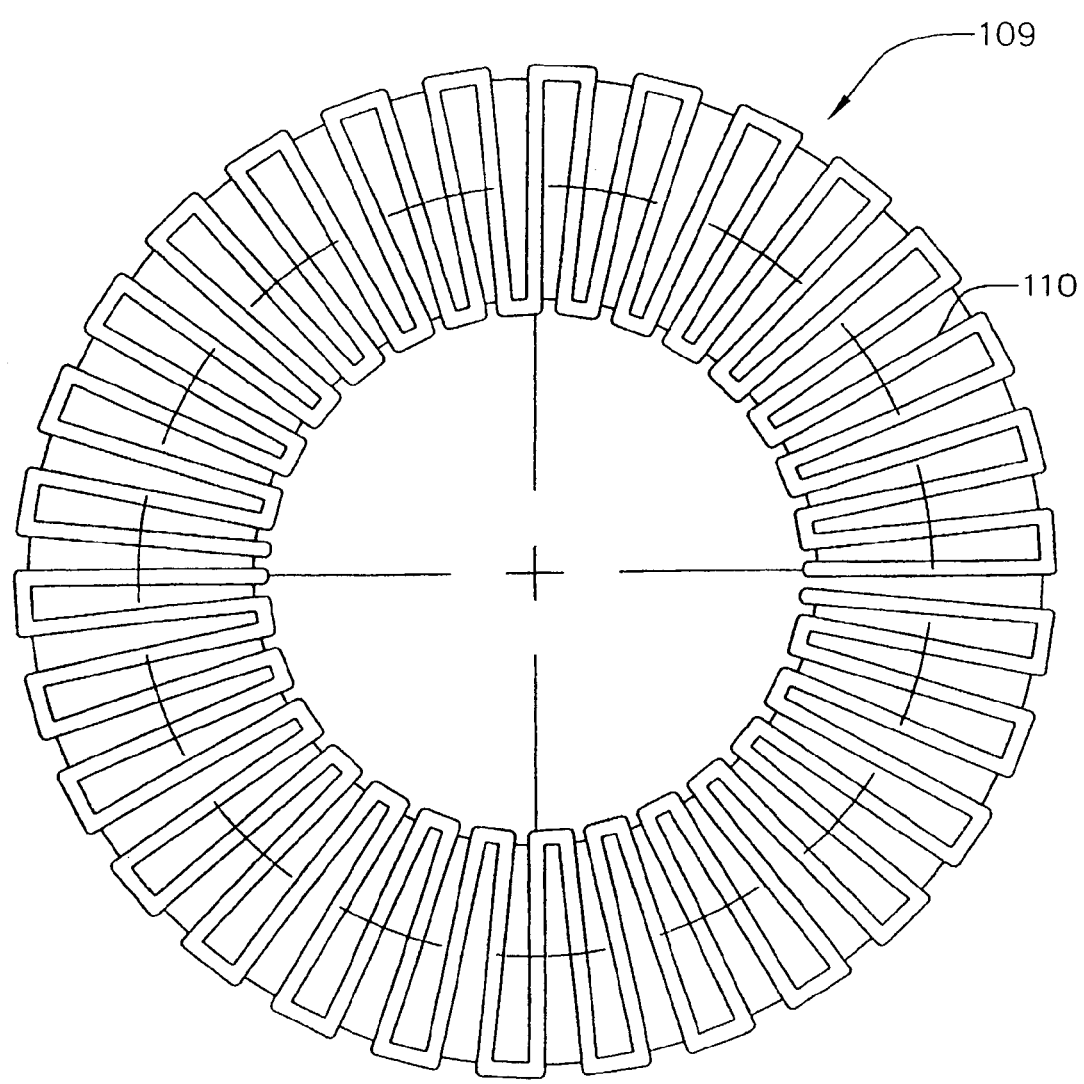
FIG. 6 is a top plan view of a sealing device of this invention formed from a polymer laminated construction comprising a metal substrate configured to provide a desired resiliency.

FIG. 6 illustrates an example embodiment sealing device 109 of this invention wherein the metallic substrate portion 110 of the laminated sheet stock material has been configured in the form of a spring washer. Although this particular example has been configured having a continuous structure, i.e., wherein the individual substrate members forming the springs are attached to one another, it is to be understood within the scope of this invention that the substrate can be configured a variety of different ways (comprising independent or continuous/integral substrate members) depending on the particular seal device configuration and/or sealing application.

Figure 20:
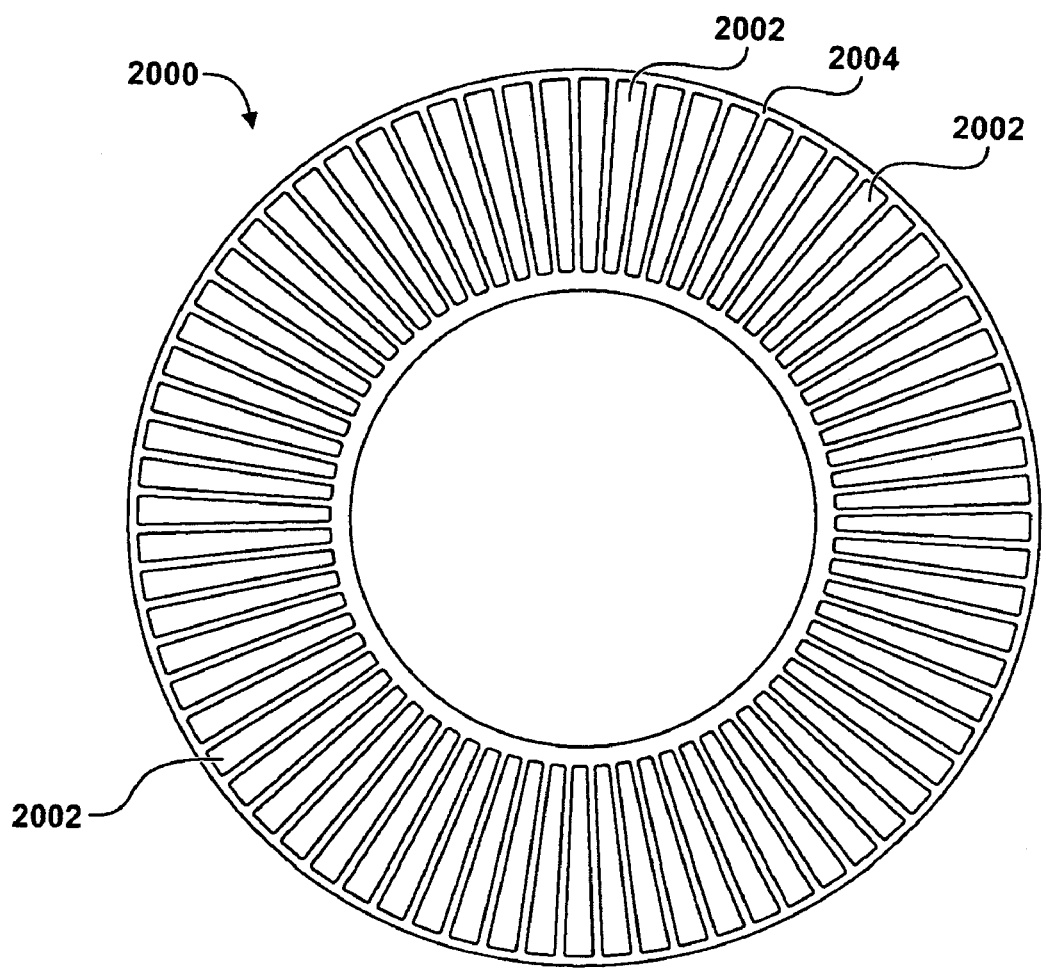
FIGS. 20, 21, 22 and 23 are top plan views of laminate constructions useful for forming seal devices.
Figure 21:
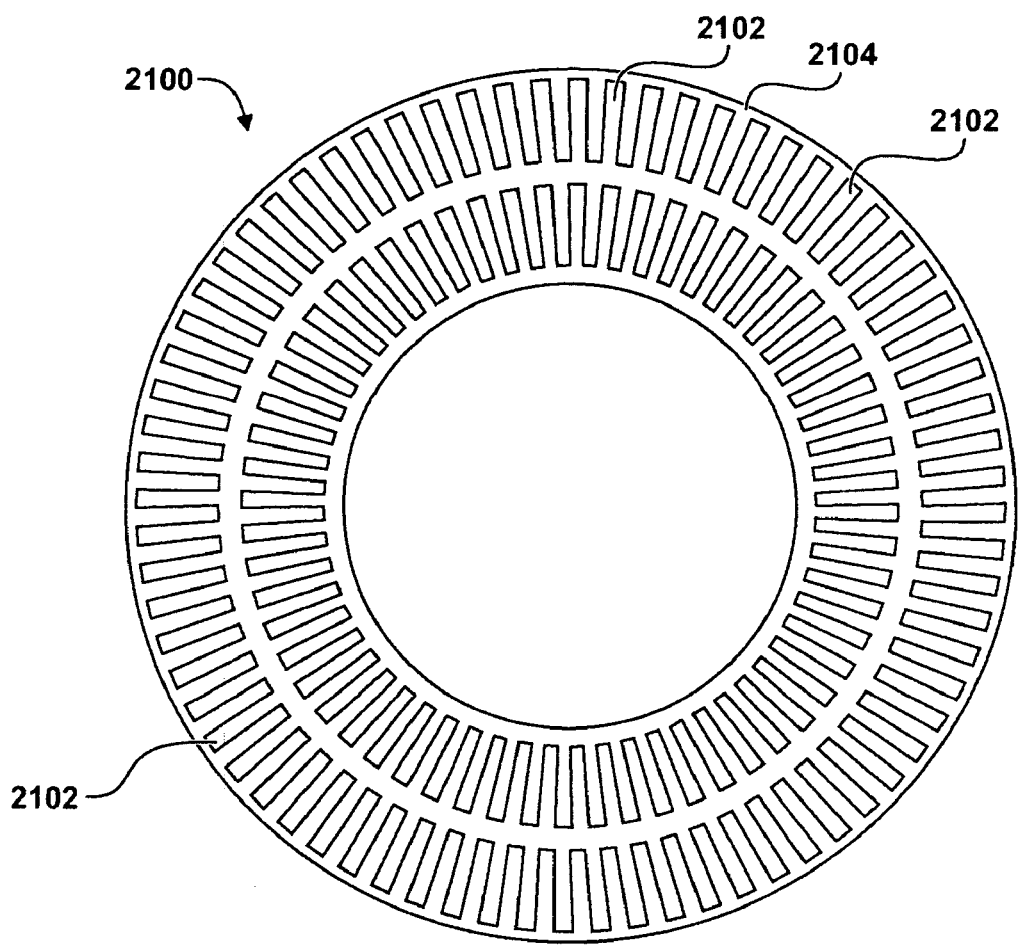

For example, FIG. 20 illustrates a top plan view of a laminate construction 2000 that includes a pattern of independent rigid members 2002, such as individual metal fingers or tines, laminated to a flexible layer 2004. In another example, FIG. 21 illustrates a laminate construction 2100 that includes a patterned continuous rigid layer 2102, for example, having connected tines, laminated to a flexible layer 2104. In one exemplary embodiment, the inner contour of the rigid layer is not parallel to the inner contour of the flexible layer. The contour along the tines of both annular seal embodiments illustrated in FIGS. 20 and 21 varies radially with respect to a center point of the respective laminate constructions when moving along the contour.

Figure 22:
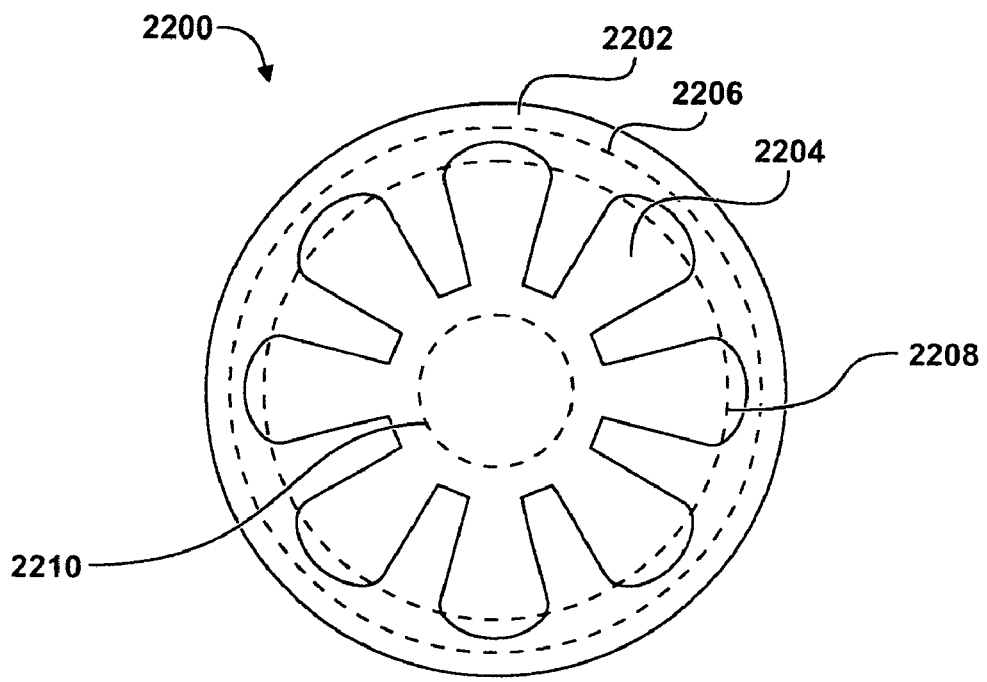

In a further exemplary embodiment, FIG. 22 illustrated a laminate construction 2200 that includes a patterned rigid layer 2202 laminated to a flexible layer 2204. The laminate construction 2200 may be further cut along cut line 2206 or cut line 2208. When the laminate construction 2200 is further cut along cut line 2206, the patterned rigid layer 2202 forms a continuous contour. Alternatively, when the laminate construction 2200 is cut along cut line 2208, a pattern of individual rigid members is formed. The laminate construction 2200 may also be cut along 2210 to form an opening. When shape formed, these laminate constructions, for example, shown in FIGS. 20, 21, and 22, may be configured to form annular seals.

Figure 23:
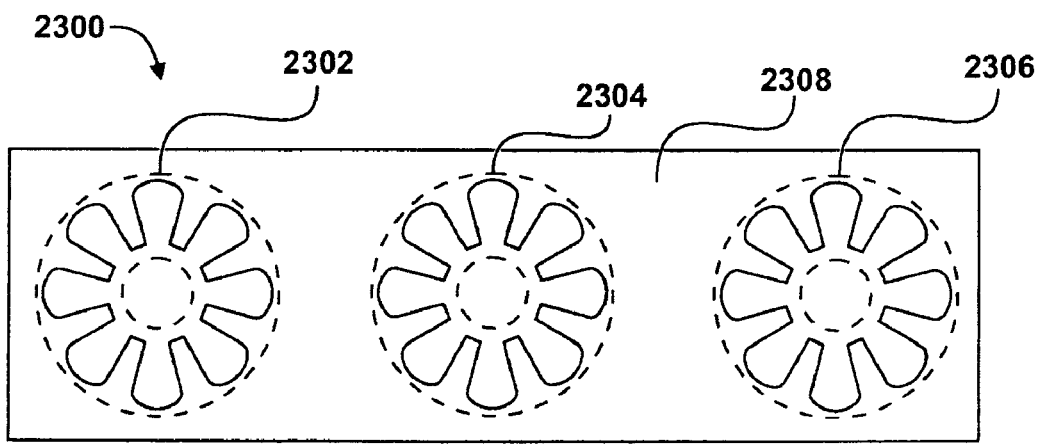

FIG. 23 illustrates an alternative embodiment of a laminate construction 2300 that includes a sheet 2308 of rigid material in which seal patterns, such as patterns 2302, 2304, and 2306, may be formed. Such patterns may be formed in the rigid material prior to lamination to a flexible layer or after lamination. The patterns 2302, 2304, and 2306 may subsequently be cut from the sheet and shape formed. In alternative embodiment, the cutting and shape forming may be performed concurrently or in various orders. In one particular embodiment, the laminate construction 2300 may be rolled to form a roll from which laminate is paid to cutting and shape forming machines.

As illustrated above, seal devices, comprising rigid material, such as a loading members formed from the metallic substrate, can be formed a number of different ways. For example, the metallic substrate can be configured, such as patterned, into the desired loading member configuration by laser or other type cutting or patterning methods. The so-formed loading member is then laminated with the polymer material, and the laminated construction is then shape formed into the desired sealing device configuration. Alternatively, the metallic substrate can be configured or patterned into the desired loading member configuration after formation of the polymer laminated construction by etching or other equivalent method. The so-formed polymer laminated construction is then shape formed into the desired sealing device configuration.

For example, the rigid material may be patterned with a radially varying contour and laminated to a flexible layer to form a laminated construction. The laminated construction may be further patterned. Alternatively, the laminated construction may be cut, such as into a pre-formed flat laminate useful in forming a seal device. The pre-form flat laminate or the laminated construction may be shape formed into the seal device.

In an alternative embodiment, the rigid material layer is laminated to the flexible layer. The rigid layer is patterned, such as through etching, and the patterned laminate is shape formed to form a seal device. Optionally, depending on the configuration of the laminate construction, the laminate construction may be cut prior to shape forming or after shape forming.

In one particular embodiment, a rigid material layer, such as a metallic sheet, is laminated to a flexible material layer, such as a polymer sheet, for example, a fluoropolymer sheet, to form a laminate construction. The layers may be laminated using a hot processed melt adhesive, and, in particular, a fluoropolymer melt adhesive, such as PFA and ETFE. The rigid material layer may be patterned before lamination or after lamination and the laminate construction may be cut. For example, the rigid material may be patterned prior to lamination to form a laminate construction, such as the laminate construction illustrated in FIG. 22. The laminate construction may be cut along a cut line to form individual rigid members or a continuous rigid member. Alternately, the rigid material may be patterned after lamination. Subsequently, the laminate construction is shape formed to form a sealing device.

FIG. 7 illustrates an L-shaped seal device embodiment 112, as constructed according to principles of this invention, in the form of a ring seal as used in both seal outside diameter and inside diameter facing configurations. Such L-shaped seal ring embodiment can be used to provide a seal between either an inside diametric sealing surface (i.e., a cylindrical bore), or an outside diametric sealing surface (cylindrical shaft), and a concentric surface perpendicular to the cylindrical surface axis.

The L-shaped seal rings 114 are each shaped having an L-shaped configuration, and are each disposed within a respective seal gland 116. The seal rings 114 are both formed from the polymer laminated metallic construction described above, i.e., the sheet stock in a preferred embodiment, and comprise a seal body having a rigid metallic casing 118 and a sealing element 120 laminated thereto. As before, the rigid metallic casing 118 is configured to provide the necessary shape to the seal ring, and to induce the sealing element against the oppositely oriented dynamic surface (not shown). Such L-shaped seal rings are fabricated in the same manner as described above for the lip seal embodiments of this invention, i.e., by suitable forming techniques. Additionally, while L-shaped seals of this invention have been described in the form of a seal ring, it is to be understood that L-shaped seals of this invention can be linear to provide a seal between two non-cylindrical surfaces.

FIGS. 8A and 8B illustrate axial U-cup seal device embodiments, as prepared according to principles of this invention, typically used to deal between parallel flat surfaces. Specifically, FIG. 8A illustrates a U-cup seal ring 122 disposed in an inside facing axial seal gland 124. The U-cup seal ring is configured in the shape of a "U" from the polymer laminate metallic construction described above, i.e., the sheet stock in a preferred embodiment, and comprises a seal body having an inwardly disposed rigid metallic casing 126, and a polymeric sealing element 128 laminated to the casing and interposed between the seal gland 124 and the casing. The seal ring 122 is positioned within the seal gland with a first axial-facing surface 130 disposed against an adjacent seal gland surface, and a second axial-facing surface 132 disposed against a dynamic sealing surface 134. The metallic casing 126 is configured to provide the necessary shape to the seal ring, and to induce the sealing element 128 axial-facing surfaces against the respective gland and dynamic sealing surfaces. FIG. 8B illustrates a U-cup seal ring 136 disposed in an outside facing axial seal gland 138. Like the seal ring embodiment illustrated in FIG. 8A, this U-cup seal ring is configured in the shape of a "U" from the polymer laminate metallic construction described above, i.e., the sheet stock in a preferred embodiment, and comprises a seal body having an inwardly disposed rigid metallic casing 140, and a polymeric sealing element 142 laminated to the casing and interposed between the seal gland 138 and the casing. The seal ring 136 is positioned within the seal gland with a first axial-facing surface 144 disposed against an adjacent seal gland surface, and with a second axial-facing surface 146 disposed against a dynamic sealing surface 148. The metallic casing 140 is configured to provide the necessary shape to the seal ring, and to induce the sealing element 142 axial-facing surfaces against the respective gland and dynamic sealing surfaces.

In an example embodiment, the seal rings of FIGS. 8A and 8B are disposed within a seal gland positioned within an axial end of a cylindrical member to provide a desired seal against an adjacently positioned piston member axial end surface. Alternatively, the seal rings may be disposed within a seal gland positioned within an axial end of a piston member to provide a desired seal against an adjacently positioned cylindrical member axial end surface.

FIG. 9A illustrates a radial U-cup seal ring 150 of this invention disposed in a radial split seal gland 152 formed by surface members 154 and 156. Radial U-cup seal rings of this invention are typically used to seal a void between two different concentrically arranged surfaces. The U-cup seal ring is configured in the shape of a "U" from the polymer laminate metallic construction described above, i.e., the sheet stock in a preferred embodiment, and comprises a seal body having an inwardly disposed rigid metallic casing 158, and a polymeric sealing element 160 laminated to the casing and interposed between the seal gland 152 and the casing. The seal ring 150 is positioned within the seal gland with a first radial-facing surface 162 disposed against an adjacent seal gland surface, and a second radial-facing surface 164 disposed against a dynamic sealing surface 166. The metallic casing 158 is configured to provide the necessary shape to the seal ring, and to induce the sealing element 160 radial-facing surfaces against the respective gland and dynamic sealing surfaces.

In an example embodiment, the seal ring of FIG. 9A is disposed within a seal gland positioned along inside diameter of a cylindrical member to provide a desired seal against a concentrically positioned piston member surface. Alternatively, the seal ring may be disposed within a seal gland positioned along an outside diameter of a piston member to provide a desired seal against a concentrically positioned cylindrical member surface.

Figure 9B:
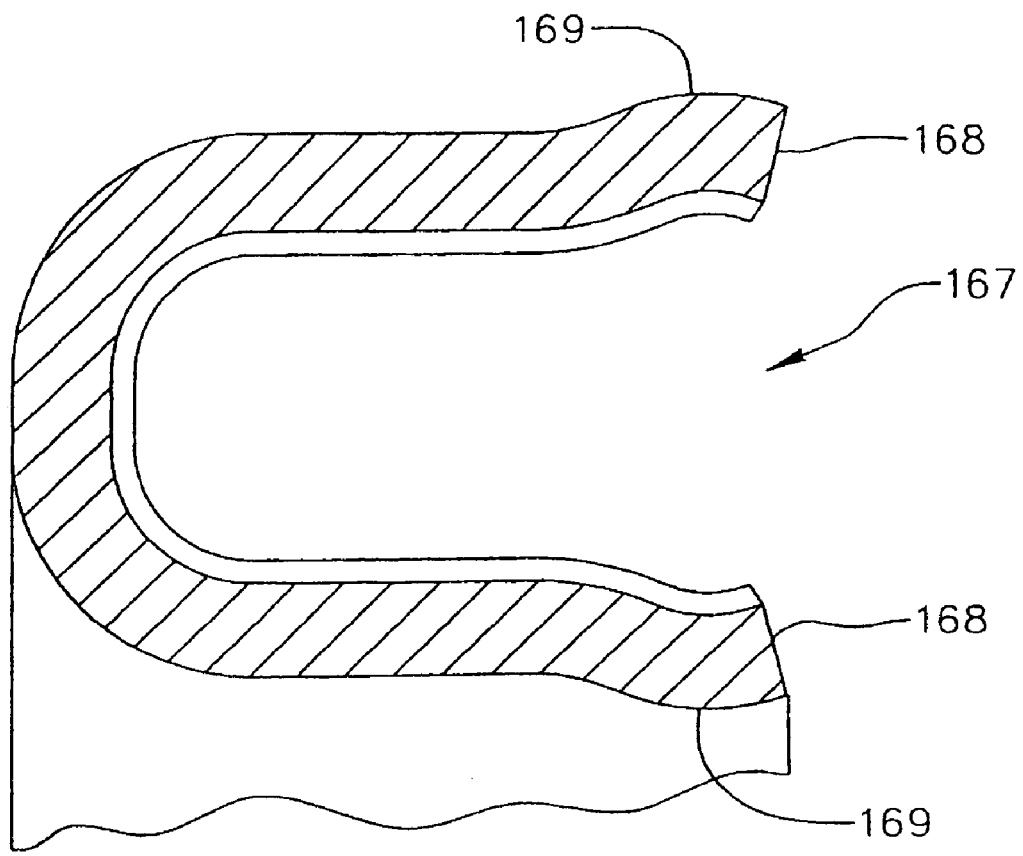
FIG. 9B is a cross-sectional side elevational view illustrating a U-cup seal, as constructed according to principles of this invention from a polymer laminated construction, having a lip sealing configuration.

FIG. 9B illustrates a U-cup seal ring 167 of this invention that is somewhat similar to that disclose above and illustrated in FIGS. 8A, 8B, and 9A, except for the fact that it includes one or more axially directed ends that are disposed radially outwardly to form a sealing lip 169. The sealing lip can be positioned on the inside and/or outside diameter of the seal ring depending on the particular sealing application.

Each of the U-cup seal ring embodiments described above and illustrated in FIGS. 8A, 8B, 9A and 9B are fabricated in the same manner as described above for the lip seal embodiments of this invention, i.e., by suitable forming techniques. In an example embodiment, such U-cup seals are formed from the laminated construction, e.g., a sheet shock, using punching or solid-state-fluid hydroforming, or other forming process. This process may or may not be preformed with thermal enhancements, chemical etching, coherent light laser cutting, or fluid jet cutting.

As with the other described and illustrated sealing devices of this invention, U-cup seals can be constructed having a linear configuration to provide a seal between other than circular sealing surfaces.

Figure 10:
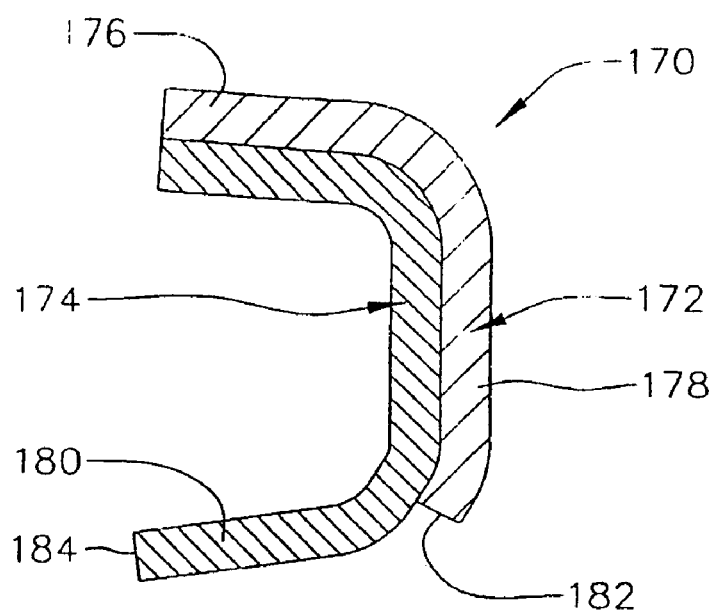
FIG. 10 is a cross-sectional side elevational view illustrating a lip seal of this invention, formed from a polymer laminated construction, and comprising a single rigid substrate configured to impose a desired force onto a single compliant sealing element.

FIG. 10 illustrates a seal ring similar to that disclosed above and illustrated in FIG. 4, in the form of a lip seal 170. The lip seal 170 comprises a seal body constructed from the polymer laminated construction, described above and illustrated in FIG. 3. The lip seal body comprises a metallic substrate 172 and a low friction layer of sealing polymer compound 174 adherently bonded to at least a portion of the substrate. The sealing polymer compound 174 is in resilient contact with a sealing surface to provide a leak-tight seal thereagainst. The sealing surface may be static or dynamic relative to the sealing polymer compound 174.

The metallic substrate 172 is in the form of a rigid casing that is configured to both facilitate attachment with a seal gland, and impose a desired compression or load force onto the sealing polymer compound 174 when installed against a sealing surface such as a dynamic shaft surface. The sealing polymer compound 174 is in the form of a sealing element that is configured to provide a leak-tight seal when placed into engagement with a dynamic shaft surface. The sealing element is adherently attached to the casing along the axial and radial extending surfaces 176 and 178, and includes an inwardly projecting portion 180 that extends beyond the casing inside diameter 182, and that terminates at a sealing lip 184.

In this particular embodiment, the casing 172 inside diameter end 182 is configured having an axially-oriented deflection or "kick" that is provided to impose a desired urging force onto the sealing element. This deflection helps to increase media pressure capability, which is desired for purposes of enhancing the sealing performance of the seal. Such deflection can be provided during the forming process.

Figure 11:
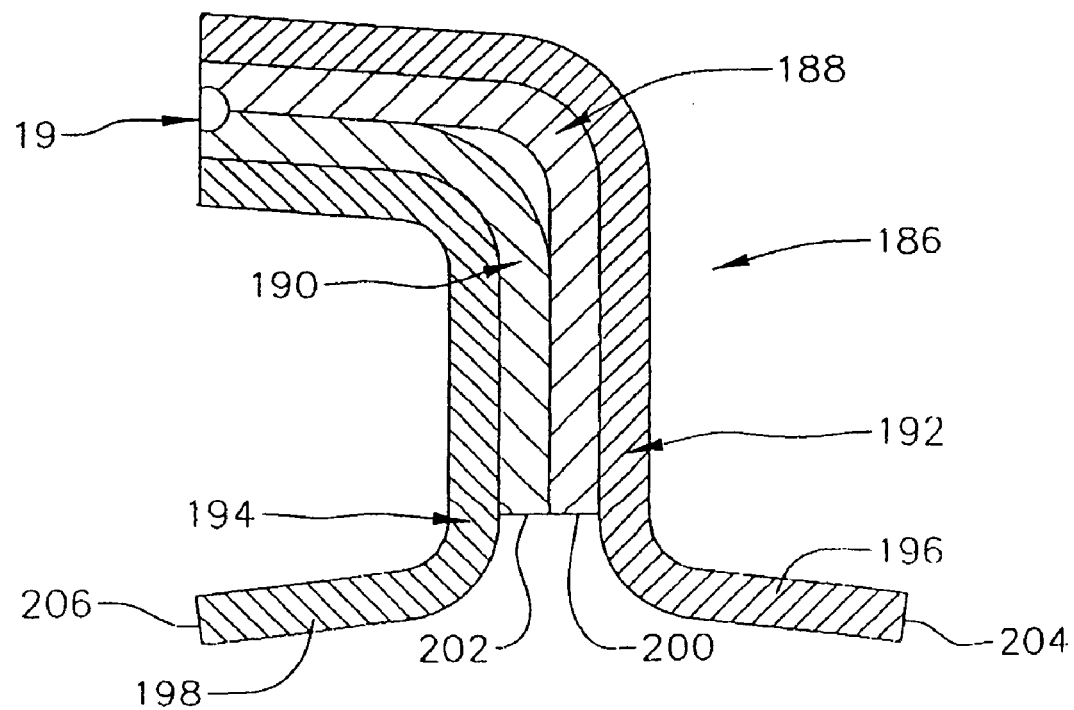
FIG. 11 is a cross-sectional side elevational view illustrating a lip seal of this invention, formed from a polymer laminated construction, and comprising dual sealing elements with dual joined together rigid substrates.

FIG. 11 illustrates a seal ring 186 constructed, according to principles of this invention, from two joined together polymer laminated constructions, as described above and illustrated in FIG. 3. In this particular seal ring embodiment, the lip seal body comprises two metallic substrates 188 and 190 that are configured to fit against one another, and that are joined together at mutual outside diameter ends 192. The metallic substrates can be joined together by conventional metal joining techniques, e.g., by spot welding or by adhesive bonding. The seal ring comprises dual sealing polymer compounds 192 and 194 in the form of sealing elements that are each bonded to respective metallic substrates 188 and 190. The metallic substrates are configured to provide the desired shape to the seal ring to both facilitate attachment with a seal gland, and impose a desired compression or load force onto the sealing polymer compound 192 and 194 when installed against a sealing surface such as a dynamic shaft surface.

In this particular embodiment, sealing element 192 formed an outside diameter of the seal ring. Using a polymer compound to form the seal ring outside diameter may be desirable in certain applications where a relatively compliant mating seal ring surface is necessary to ensure a proper fitment into a seal gland. In this example embodiment, the sealing elements project axially away in opposite directions from respective metal substrates. Each sealing element includes axially outwardly projecting portions 196 and 198 that each extend beyond the respective metal substrate inside diameters 200 and 202. Each sealing element includes a sealing lip 204 and 206 that defines a terminal end of each respective projecting portion.

Seal rings comprising dual sealing elements may be desirable in applications calling for a wiper seal, in addition to a primary seal, for purposes of keeping unwanted debris away from the primary seal, thereby operating to increase the effective service life of the seal. Seal rings comprising dual sealing elements are made in the same manner, and from the same materials, described above, i.e., by a single step of forming. However, an additional step of combining the two formed seal rings together is required.

Figure 12:
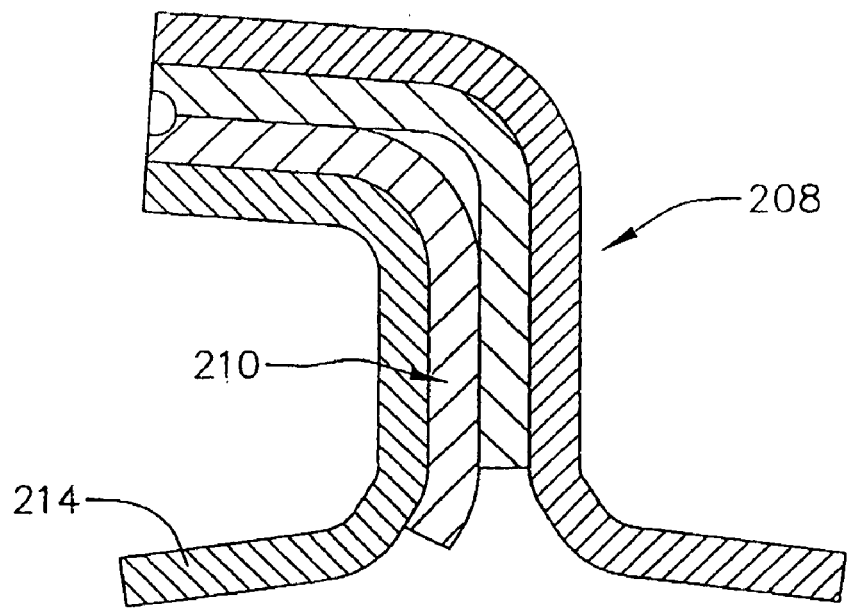
FIG. 12 is a cross-sectional side elevational view illustrating a lip seal of this invention, formed from a polymer laminated construction, and comprising dual sealing elements with dual joined together rigid substrates, wherein one of the rigid substrate ends is configured to impose a desired force against a sealing element.

FIG. 12 illustrates a seal ring 208 similar to that discussed above and illustrated in FIG. 11, with the sole exception that one of the metal substrates 210 has an inside diameter end 212 configured having an axially-oriented deflection or "kick." This deflection is provided to increase media pressure capability to the sealing element 214 for purposes of preventing seal element 214 from distorting rearward, which is desired for purposes of enhancing the sealing performance of the seal. Such deflection can be provided during the forming process.

Figure 13:
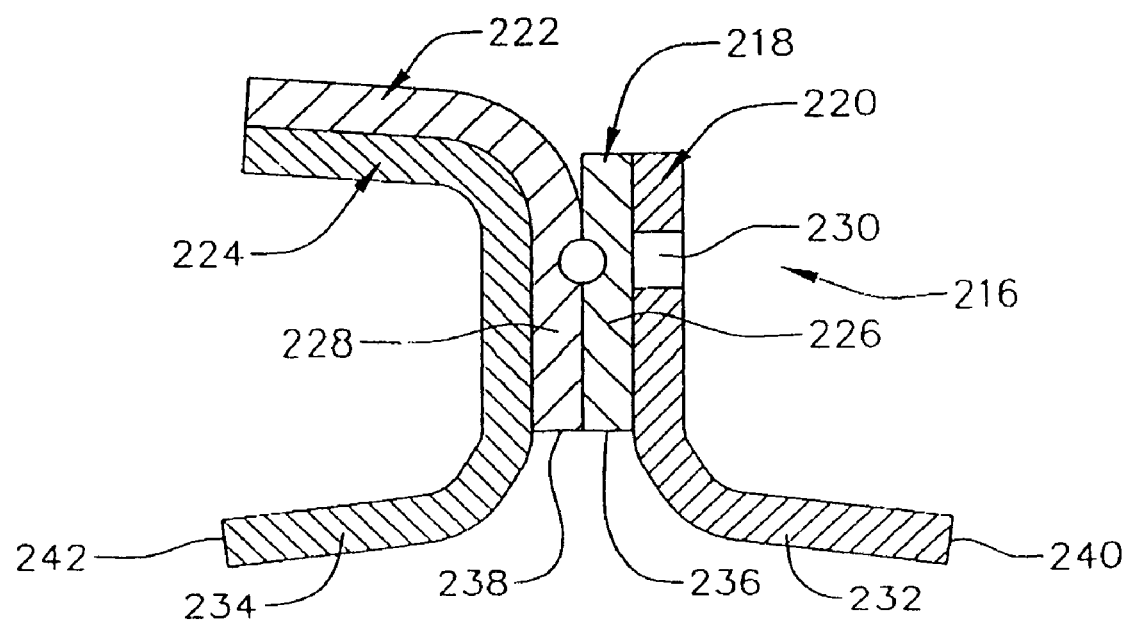
FIG. 13 is a cross-sectional side elevational view illustrating a lip seal of this invention, formed from a polymer laminated construction, comprising dual sealing elements and a joined together full and partial rigid substrate.

FIG. 13 illustrates a seal ring 216 constructed, according to principles of this invention, from two joined together polymer laminated constructions, as described above and illustrated in FIG. 3. This particular seal ring embodiment is similar to that discussed above and illustrated in FIG. 11, with the exception that it includes a partial metal substrate 218 and seal element 220 pair, i.e., the metal substrates and respective seal elements are not the same length. In this embodiment, the metal substrates 218 and 222 are joined together along only a partial length, as metal substrate 218 does not include an axially projecting portion to follow metal substrate 222. Thus, the metal substrate 222 defines an outside diameter of the seal ring for fitment within or against a seal gland or the like. Additionally, in this embodiment, sealing element 220 also does not include an axially projecting portion like that of sealing element 224.

The metal substrates 218 and 222 are attached together by conventional techniques, e.g., by welding or adhesive bonding, and are attached together along adjacently position radially projecting portions 226 and 228. In an example embodiment, the metal substrates are welded together, and access to the welding area is provided by an opening disposed through the sealing element 220.

Like the ring seal embodiment illustrated in FIG. 11, the sealing elements project axially away in opposite directions from its respective metal substrates. Each sealing element includes axially outwardly projecting portions 232 and 234 that each extend beyond the respective metal substrate inside diameters 236 and 238. Each sealing element includes a sealing lip 204 and 206 that defines a terminal end of each respective projecting portion.

Figure 14:
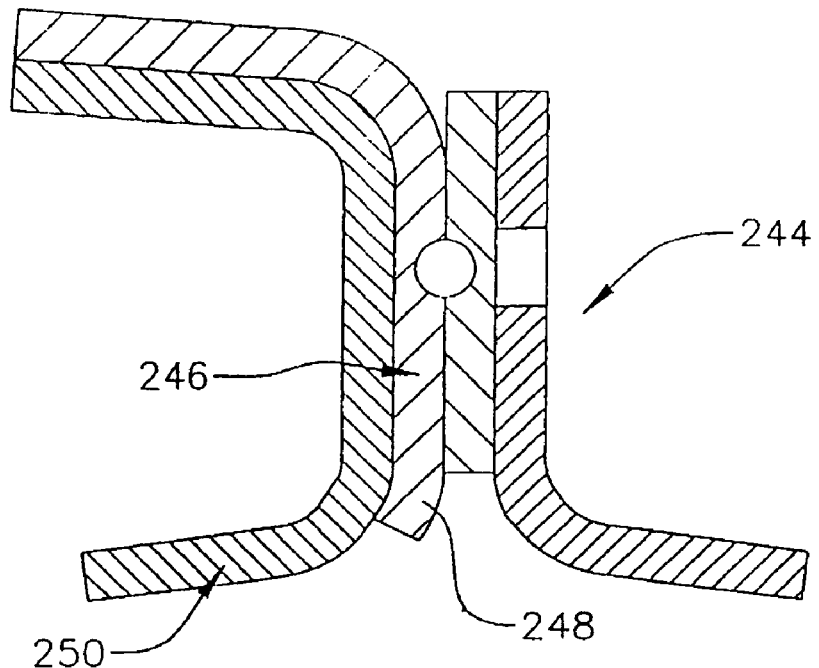
FIG. 14 is a cross-sectional side elevational view illustrating a lip seal of this invention, formed from a polymer laminated construction, comprising dual sealing elements and a joined together full and partial rigid substrate, wherein one of the rigid substrate ends is configured to impose a desired force against a sealing element.

FIG. 14 illustrates a seal ring 244 constructed, according to principles of this invention, from two joined together polymer laminated constructions, as described above and illustrated in FIG. 3. This particular seal ring embodiment is similar to that discussed above and illustrated in FIG. 13, with the exception that the metal substrate 246 includes an inside diameter end 248 that is configured having an axially-oriented deflection or "kick" that is provided to increase media pressure capability to the sealing element 250. This deflection helps prevent sealing element 250 from distorting rearward, which is desired for purposes of enhancing the sealing performance of the seal. Such deflection can be provided during the forming process.

Figure 15:
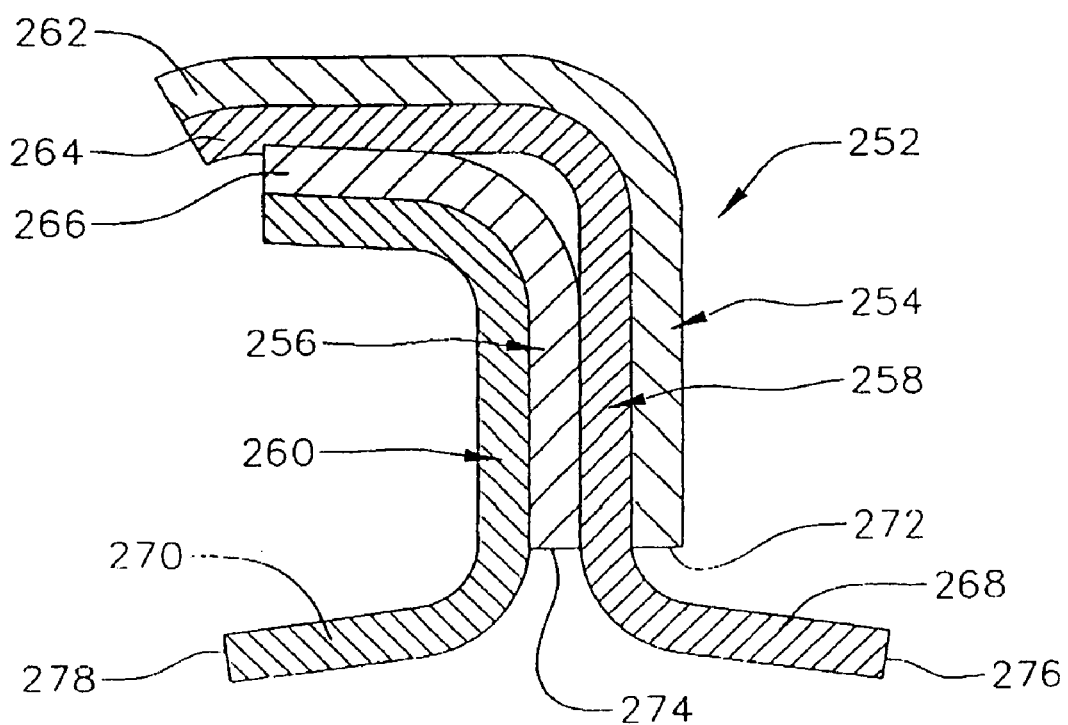
FIG. 15 is a cross-sectional side elevational view illustrating a lip seal of this invention, formed from a polymer laminated construction, comprising dual sealing elements and separated rigid substrates.

FIG. 15 illustrates a seal ring 252 constructed, according to principles of this invention, from two joined together polymer laminated constructions, as described above and illustrated in FIG. 3. In this particular seal ring embodiment, the lip seal body comprises two metallic substrates 254 and 256 and respective sealing polymer compounds 258 and 260 that form sealing elements. Unlike the seal ring embodiment illustrated in FIG. 11, this embodiment seal ring does not include joined together metal substrates, and does not have an outside diameter formed from a polymer compound. Rather, the metal substrates 245 and 256 are separated by sealing element 258, and the seal ring outside diameter is formed from metal substrate 254.

The two metal substrate and polymer compound pairs forming the seal ring 252 are joined together by mechanical interlock, rather than by welding or bonding. In this example, the two pairs are joined together by conventional rolling and crimping technique. Specifically, metal substrate 256 is sized and shaped to fit within the axial and radial dimensions of the metal substrate 254 and sealing element 258 pair. The metal substrate 256, and respective sealing element 260 is locked into position against sealing element 258 by crimping an outside diameter end 262 of metal substrate 254 radially inwardly, causing an end portion 264 of sealing element 258 to be urged against an end 266 of the metal substrate 256. This urging force operates to forming a mechanical lock between the pairs.

Like the seal ring embodiment of FIG. 11, the metallic substrates are configured to provide the desired shape to the seal ring to both facilitate attachment with a seal gland, and impose a desired compression or load force onto the sealing polymer compounds 268 and 270 when installed against a sealing surface such as a dynamic shaft surface. The sealing elements project axially away in opposite directions from its respective metal substrates. Each sealing element includes axially outwardly projecting portions that each extend beyond the respective metal substrate inside diameter ends 272 and 274, and further include a sealing lip 276 and 278 that defines a terminal end of each respective projecting portion.

Seal rings comprising dual sealing elements configured according to this embodiment are made in the same manner, and from the same materials, described above, i.e., by a single step of forming. However, an additional step of combining the two formed seal rings together is required.

Figure 16:
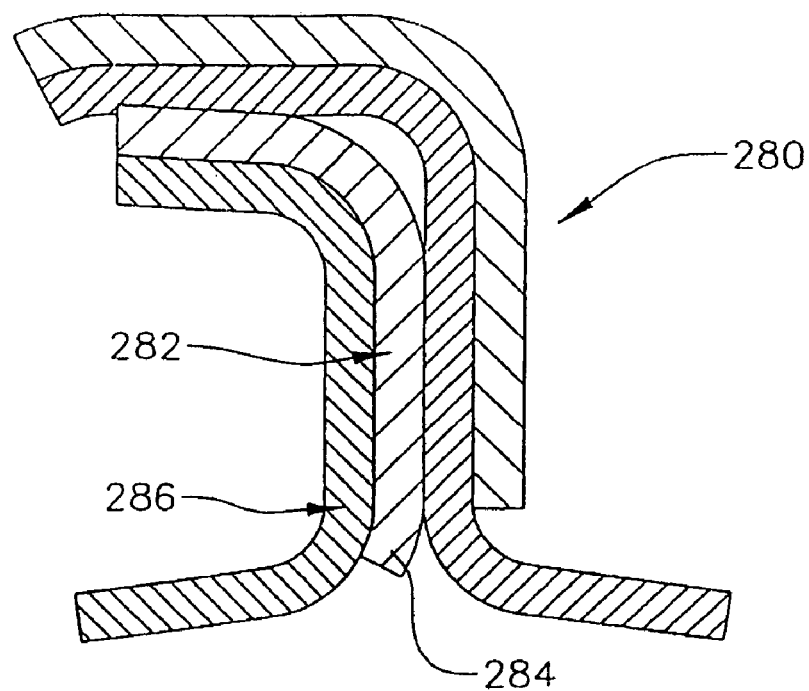
FIG. 16 is a cross-sectional side elevational view illustrating a lip seal of this invention, formed from a polymer laminated construction, comprising dual sealing elements and separated rigid substrates, wherein one of the rigid substrate ends is configured to impose a desired force against a sealing element.

FIG. 16 illustrates a seal ring 280 constructed, according to principles of this invention, from two joined together polymer laminated constructions, as described above and illustrated in FIG. 3. This particular seal ring embodiment is similar to that discussed above and illustrated in FIG. 15, with the exception that the metal substrate 282 includes an inside diameter end 284 configured having an axially-oriented deflection or "kick" that is provided to increase media pressure capability to the sealing element 286. This deflection helps to prevent the sealing element 286 from distorting rearward, which is desired for purposes of enhancing the sealing performance of the seal. Such deflection can be provided during the forming process.

Figure 17:
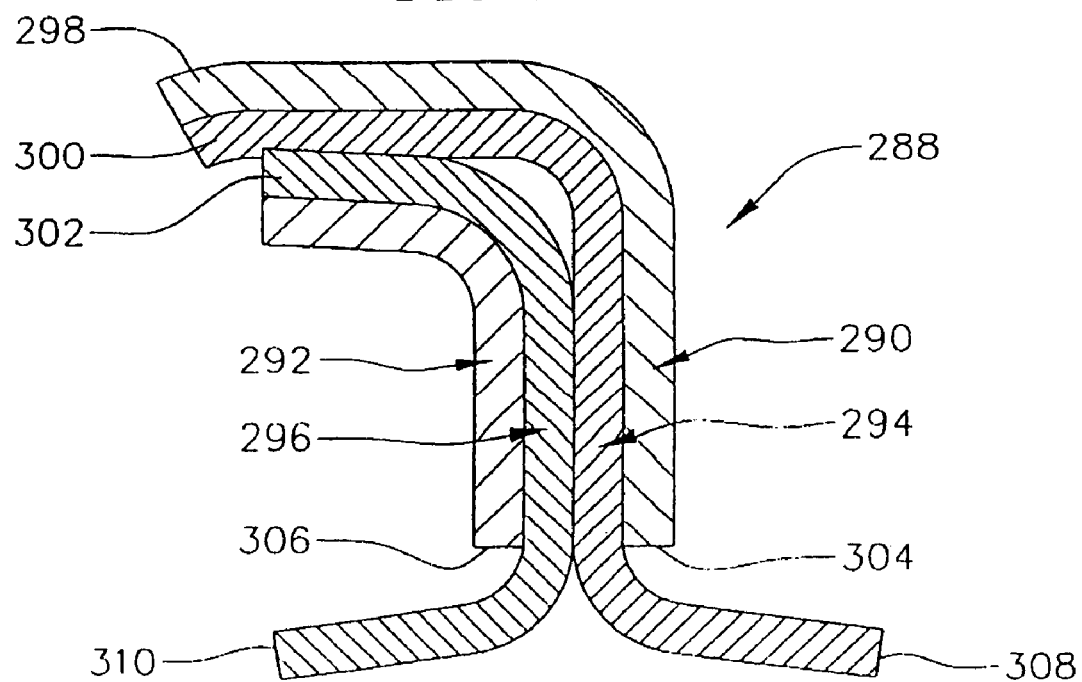
FIG. 17 is a cross-sectional side elevational view illustrating a lip seal of this invention, formed from a polymer laminated construction, comprising dual joined together sealing elements.

FIG. 17 illustrates a seal ring 288 constructed, according to principles of this invention, from two joined together polymer laminated constructions, as described above and illustrated in FIG. 3. In this particular seal ring embodiment, the lip seal body comprises two metallic substrates 290 and 292 and respective sealing polymer compounds 294 and 296 that form sealing elements. Unlike the seal ring embodiment illustrated in FIG. 11, this embodiment seal ring also does not include joined together metal substrates, and also does not have an outside diameter formed from a polymer compound. Rather, the seal ring outside diameter is formed from metal substrate 290, and the two sealing elements 294 and 296 are joined together and both interposed between the two metal substrates.

Like the seal ring embodiment discussed above and illustrated in FIG. 15, the two metal substrate and polymer compound pairs forming the seal ring 288 are joined together by mechanical interlock, rather than by welding or bonding. In this example, the two pairs are joined together by conventional rolling and crimping technique. Specifically, metal substrate 292 is sized and shaped to fit within the axial and radial dimensions of the metal substrate 290 and sealing element 294 pair. The metal substrate 292, and respective sealing element 296 are locked into position against sealing element 290 by crimping an outside diameter end 298 of metal substrate 290 radially inwardly, causing an end portion 300 of sealing element 294 to be urged against an end 302 of sealing element 296. This urging force operates to forming a mechanical lock between the pairs.

Like the other disclosed and illustrated seal ring embodiments comprising dual sealing elements, the metallic substrates are configured to provide the desired shape to the seal ring to both facilitate attachment with a seal gland, and impose a desired compression or load force onto the sealing polymer compounds 294 and 296 when installed against a sealing surface such as a dynamic shaft surface. The sealing elements project axially away in opposite directions from its respective metal substrates. Each sealing element includes axially outwardly projecting portions that each extend beyond the respective metal substrate inside diameter ends 304 and 306, and further includes respective sealing lips 308 and 310 that define a terminal end of each respective projecting portion. Seal rings comprising dual sealing elements configured according to this embodiment are made in the same manner, and from the same materials, described above, i.e., by a single step of forming. However, an additional step of combining the two formed seal rings together is required.

Figure 18:
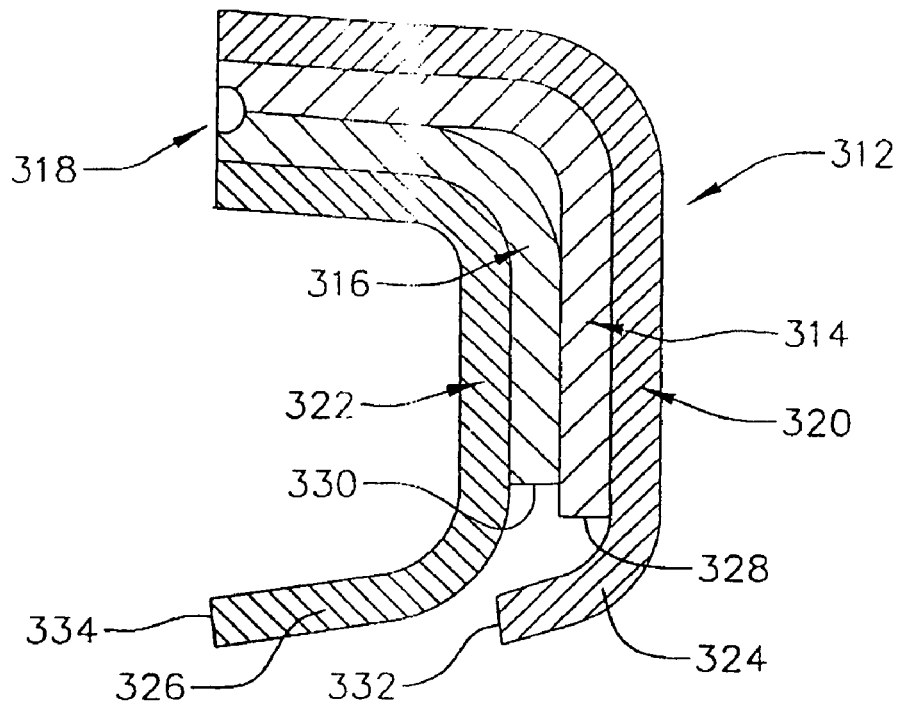
FIG. 18 is a cross-sectional side elevational view illustrating a lip seal of this invention, formed from a polymer laminated construction, comprising dual sealing elements and joined together rigid substrates, wherein the sealing elements are similarly oriented.

FIG. 18 illustrates a seal ring 312 constructed, according to principles of this invention, from two joined together polymer laminated constructions, as described above and illustrated in FIG. 3. Like the embodiment illustrated in FIG. 11, in this ring seal embodiment the lip seal body comprises two metallic substrates 314 and 316 that are configured to fit against one another, and that are joined together at mutual outside diameter ends 318. The metallic substrates 314 and 316 can be joined together by conventional metal joining techniques, e.g., by spot welding or by adhesive bonding. The seal ring comprises dual sealing polymer compounds 320 and 322 in the form of sealing elements that are each bonded to respective metallic substrates 314 and 316. The metallic substrates are configured to provide the desired shape to the seal ring to both facilitate attachment with a seal gland, and impose a desired compression or load force onto the sealing polymer compounds 320 and 322 when installed against a sealing surface such as a dynamic shaft surface.

This ring seal is similar to that illustrated in FIG. 11 except for the fact that both of the sealing elements 320 and 322 include projecting portions 324 and 326 that are oriented in the same, and not opposed, axial directions. Additionally, the metal substrates 314 and 316 are configured having differently sized, i.e., different length, inside diameter ends 328 and 330. Specifically, metal substrate 314 is configured having an inside diameter end 328 that projects radially inwardly a distance greater than that of the metal substrate inside diameter end 330. This is done for purposes of imposing a desired urging force against the sealing element 320, thereby controlling the radially outwardly directed deflection of sealing element projecting portion 324 when placed into contact against a sealing surface. Like the other dual sealing element ring seal embodiments of this invention, each sealing element includes a sealing lip 332 and 334 that defines a terminal end of each respective projecting portion.

Figure 19:
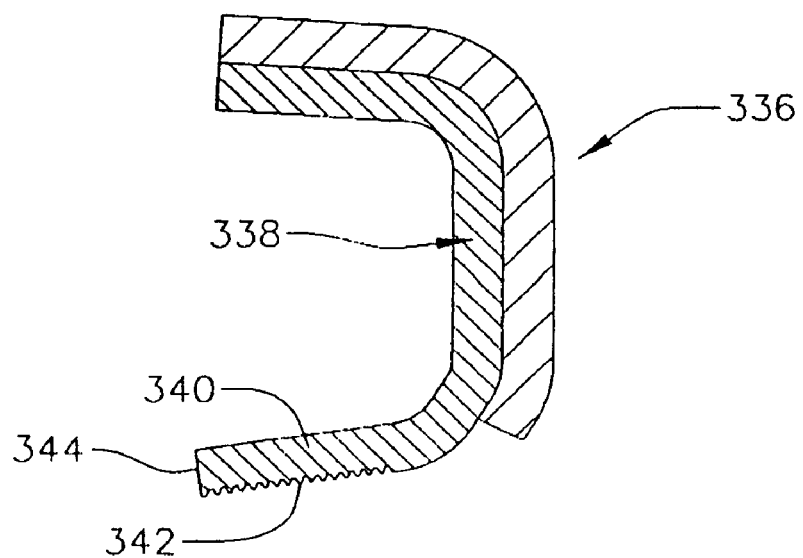
FIG. 19 is a cross-sectional side elevational view illustrating a lip seal of this invention, formed from a polymer laminated construction, comprising a sealing element having a threaded sealing surface.

FIG. 19 illustrates a seal ring similar to that disclosed above in illustrated in FIG. 10, in the form of a lip seal 336. This embodiment seal ring, includes a sealing polymer compound 338, forming a sealing element, including a projecting portion 340 having a sealing surface 342 that is configured having a plurality of threads disposed thereon, e.g., as illustrated in FIG. 5C. Specifically, the sealing surface 342 is designed having a threaded surface to provide a hydraulic pumping action of fluid leaking past the seal. The threaded surface is oriented to route fluid disposed between the sealing element sealing surface 342 and an adjacent sealing surface, e.g., of a rotary shaft, upstream towards the source of the fluid, thereby operating to control fluid leakage from the seal.

In each of the above-described and illustrated seal ring embodiments the seal body metal casing is configured to both provide the basic necessary seal ring shape, and to provide a desired urging force onto the sealing element for providing a desired leak-tight seal. To accomplish the desired urging force it may be necessary to specially configure the metallic substrate portion of the laminate construction forming the casing member. For example, if the urging force is desired to have a certain degree of resiliency or elasticity, it may be desired that the substrate have a tubular configuration to provide such resiliency. Alternatively, when dealing with a substrate in sheet stock, it may be desired that specific portions of the metal substrate of the laminate construction forming the metal casing be etched or otherwise removed to provide a spring-like resiliency, e.g., to perform in the manner of a spring washer as described above and illustrated in FIG. 6. Such modification of the substrate can take place before or after lamination with the polymer material. Ultimately, however, the manner in which the metal substrate is modified, if at all, will depend on the particular seal device embodiment and seal device application.

Other modifications and variations of seal rings, constructed according to principles of this invention, will be apparent to those skilled in the art. It is, therefore, to be understood that within the scope of the appended claims, this invention may be practiced otherwise than as specifically described.

What is claimed is:

1. A method of forming a seal device, the method comprising:
   forming a laminate construction including a flexible material layer and a rigid material layer;
   patterning the rigid material layer after forming the laminate construction to provide the rigid material layer with an inner edge and an outer edge, the inner and outer edges having contours defining distances from a center point of the laminate construction that change with angular position; and
   shape forming the laminate construction into the seal device.

2. The method of claim 1, wherein patterning the rigid material layer includes etching the rigid material layer.

3. The method of claim 1, wherein patterning the rigid material layer includes punch cutting the rigid material layer, the flexible material layer remaining substantially intact.

4. The method of claim 1, wherein patterning the rigid material layer includes laser cutting the rigid material layer.

5. The method of claim 1, wherein patterning the rigid material layer includes fluid jet cutting the rigid material layer.

6. The method of claim 1, wherein patterning the rigid material layer includes forming a continuous rigid member from the rigid material layer.

7. The method of claim 1, wherein patterning the rigid material layer includes configuring the rigid material layer in the form of a spring washer.

8. The method of claim 1, further comprising cutting the laminate construction.

9. The method of claim 8, wherein cutting the laminated construction is performed after patterning the rigid material layer.

10. The method of claim 8, wherein cutting the laminated construction forms a sealing member from the flexible material layer and a rigid member from the rigid material layer.

11. The method of claim 10, wherein, in the seal device, the sealing member and the rigid member are coextensive along the length of the rigid member.

12. The method of claim 10, wherein, in the seal device, the sealing member co-terminates at a first end of the rigid member and extends beyond the rigid member at a second end.

13. The method of claim 1, wherein forming the laminated construction includes coupling the flexible material layer to the rigid material layer using a melt adhesive.

14. A method of forming a seal device, the method comprising:

laminating a polymeric material layer to a metallic sheet to form a laminated construction;

pattering the metallic sheet and not substantially patterning the polymeric material layer after laminating the polymeric material layer to the metallic sheet to provide the metallic sheet with an inner edge and an outer edge, the inner and outer edges having contours defining distances from a center point of the laminated construction that change with angular position; and shape forming the laminated construction into the seal device.

15. The method of claim 14, wherein laminating the polymeric material layer to the metallic sheet includes laminating using a polymeric melt adhesive layer.

16. The method of claim 14, wherein shape forming the laminated construction is performed after patterning the metallic sheet.

17. The method of claim 14, futher comprising cutting the laminated construction prior to shape forming the laminated construction.

18. A method of forming a seal device, the method comprising:

forming a laminate construction including a flexible material layer and a rigid material layer;

patterning the rigid material layer after forming the laminate construction to form a plurality of independent rigid tines arranged in a pattern around a center point of the laminate construction and angularly spaced from one another; and shape forming the laminate construction into the seal device.

* * * * *